(12) United States Patent
Wakana et al.

(10) Patent No.: US 6,920,759 B2
(45) Date of Patent: Jul. 26, 2005

(54) COLD HEAT REUSED AIR LIQUEFACTION/ VAPORIZATION AND STORAGE GAS TURBINE ELECTRIC POWER SYSTEM

(75) Inventors: Harumi Wakana, Hitachi (JP); Koichi Chino, Hitachi (JP); Osamu Yokomizo, Tokai-mura (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/183,358

(22) Filed: Jun. 28, 2002

(65) Prior Publication Data
US 2003/0101728 A1 Jun. 5, 2003

Related U.S. Application Data

(60) Continuation-in-part of application No. 09/765,338, filed on Jan. 22, 2001, now abandoned, which is a division of application No. 08/991,608, filed on Dec. 16, 1997, now abandoned.

(30) Foreign Application Priority Data

Dec. 24, 1996 (JP) .............................................. 8-343061
Dec. 27, 1996 (JP) .............................................. 8-349301

(51) Int. Cl.[7] .............................. F02C 6/16; F02C 7/08; F02C 7/224
(52) U.S. Cl. .............................. 60/726; 60/727; 60/728; 60/736
(58) Field of Search ........................ 60/726, 727, 728, 60/39.183, 736, 652, 759; 62/615, 613

(56) References Cited

U.S. PATENT DOCUMENTS

| | | | |
|---|---|---|---|
| 2,760,356 A | 8/1956 | Sixsmith | |
| 3,631,673 A | * 1/1972 | Charrier et al. | 60/39.183 |
| 3,742,716 A | * 7/1973 | Backstrom | 60/772 |
| 3,757,517 A | * 9/1973 | Rigollot | 60/39.181 |
| 4,329,842 A | 5/1982 | Hoskinson, deceased | |
| 5,495,709 A | 3/1996 | Frutschi | |
| 5,537,822 A | 7/1996 | Shnaid et al. | |
| 5,626,019 A | 5/1997 | Shimizu et al. | |

FOREIGN PATENT DOCUMENTS

| | | |
|---|---|---|
| FR | 2224642 | 10/1974 |
| JP | 1-300022 | 12/1989 |
| JP | 3-54327 | 3/1991 |
| JP | 04-127850 | * 4/1992 |
| JP | 4-132837 | 5/1992 |
| JP | 4-191419 | 7/1992 |
| JP | 08-061085 | * 5/1996 |
| JP | 08-149722 | * 6/1996 |
| JP | 09-32578 | * 2/1997 |

* cited by examiner

*Primary Examiner*—Ted Kim
(74) *Attorney, Agent, or Firm*—Mattingly, Stanger & Malur, P.C.

(57) ABSTRACT

An energy storage gas-turbine electric power generating system includes a liquid air storage tank for storing liquid air, a vaporizing facility for vaporizing the liquid air stored in the liquid air storage tank, a combustor for generating a combusted gas by combusting the air vaporized by the vaporizing facility and a fuel, a gas turbine driven by the combusted gas generated in the combustor, and a gas-turbine generator connected to the gas turbine for generating electric power. The system further includes a pressurizing unit for pressurizing the liquid air stored in the liquid air storage tank up to a pressure higher than a pressure of air supplied to the combustor to supply the liquid air to the vaporizing facility, an expansion turbine driven by expanding the air vaporized by the vaporizing facility and an expansion-turbine generator connected to the expansion turbine for generating electric power.

5 Claims, 12 Drawing Sheets

COLD HEAT REUSED AIR LIQUEFACTION/ VAPORIZATION AND STORAGE GAS TURBINE ELECTRIC POWER SYSTEM

This is a Continuation-in-Part (CIP) application of U.S. Ser. No. 09/765,338 filed Jan. 22, 2001, now abandoned, which is a divisional of U.S. Ser. No. 08/991,608 filed Dec. 16, 1997, now abandoned, the entire disclosures of which are hereby incorporated by reference.

BACKGROUND OF THE INVENTION

Demand for electric power during daytime on a weekday is very large compared to demand for electric power during nighttime. Therefore, in the past, a nuclear power station and a steam power station using a steam turbine are always operated regardless of daytime and nighttime, and a hydraulic power station and a thermal power station using a gas turbine (for example, a combined cycle power station) are operated only during daytime. Further, electric demand and electric supply are balanced by pumping up water to a reservoir to a high level by driving a pump using surplus power during nighttime (power left over at the nuclear power station and the steam power station) to store as potential energy, and allowing the water to flow down during daytime, as in a pump-up hydraulic power station. In recent years, a ratio of the maximum electric demand to the minimum electric demand is gradually being increased due to wide use of home air-conditioners, and difference in seasonal dependence of the electric demand is particularly increased. Since the period necessary for the maximum electric demand is as short as around ten days in the summer, it is uneconomical to install a large scale electric generating facility for coping with solely this problem. On the other hand, there remain few sites capable of constructing a scale pump-up hydraulic power station in certain areas, and accordingly a large capacity energy storage method of another type is required to be developed.

In regard to energy storage gas-turbine electric power generating systems capable of storing energy having a gas turbine and air liquefaction/storage/vaporizing facilities, Japanese Patent Application Laid-Open No.4-132837 discloses a system in which recovery heat from the liquefaction facility and exhausted heat from the gas turbine plant are used inside and outside the electric power facility as a heat source. Further, Japanese Patent Application Laid-Open No.4-191419 discloses a system in which liquid air or liquid oxygen is produced and stored using electric power in nighttime, and vaporized in daytime to be supplied to the gas turbine.

However, in the system of Japanese Patent Application Laid-Open No.4-132837, the energy storage efficiency (a ratio of an electric power for obtaining the liquid fluid such as liquid air or liquid oxygen to an electric power generated by the plant) is not so high. In the system of Japanese Patent Application Laid-Open No.4-191419, there is no detailed description of improving the energy storage efficiency.

SUMMARY OF THE INVENTION

A first object of the present invention is to provide an energy storage gas-turbine electric power generating system having a large generating power.

A second object of the present invention is to provide an energy storage gas-turbine electric power generating system having a high energy storage efficiency.

In order to attain the first object described above, an energy storage gas-turbine electric power generating system in accordance with the present invention comprises a liquid air storage tank for storing liquid air; a vaporizing facility for vaporizing the liquid air stored in the liquid air storage tank; a combustor for generating a combusted gas by combusting the air vaporized by the vaporizing facility and a fuel; a gas turbine driven by the combusted gas generated in the combustor; a gas-turbine generator connected to the gas turbine for generating electric power; a pressurizing unit for pressurizing the liquid air stored in the liquid air storage tank up to a pressure higher than a pressure of air supplied to the combustor to supply the liquid air to the vaporizing facility; and an expansion turbine driven by expanding the air vaporized by the vaporizing facility; and an expansion-turbine generator connected to the expansion turbine for generating electric power.

According to the present invention described above, since the air in a liquid state (liquid air) is pressurized and then vaporized to drive the expansion turbine by the vaporized air, there is an effect that the generating power of the system is increased as a whole. In other words, the power (electric power) required for compressing (pressurizing) the liquid is negligible compared to the power required for compressing the gas. That is, the power required for the pressurizing unit is nearly negligible, and on the other hand, a large amount of electric power can be obtained from the expansion turbine. Further, since the amount of electric power obtained by the expansion-turbine generator is added in addition to the electric power obtained by the gas-turbine generator, the generating power of the system is increased as a whole.

In order to attain the second object described above, an energy storage gas-turbine electric power generating system in accordance with the present invention comprises a compressor for compressing air; a liquid air storage tank for storing liquid air; a liquefaction/vaporizing facility for liquefying the air compressed by the compressor to produce the liquid air and vaporizing the liquid air stored in the liquid air storage tank; a combustor for generating a combusted gas by combusting the air vaporized by the liquefaction/vaporizing facility and a fuel; a gas turbine driven by the combusted gas generated in the combustor; a gas-turbine generator connected to the gas turbine for generating electric power; and an expansion unit for expanding the air vaporized by the liquefaction/vaporizing facility in a flow path where the air vaporized by the liquefaction/vaporizing facility is supplied to the combustor.

According to the present invention described above, since cold energy of the air cooled by expanding in the expansion unit is recovered when the liquid air is vaporized to be supplied to the combustor and the air compressed by the compressor is cooled using the cold energy when the liquid air is produced, there is an effect in that the energy storage efficiency is increased. Hereinafter, whenever the term cold heat is used, reference is being made to cold energy. The production ratio of the liquid air produced by the liquefaction/vaporizing facility of the energy storage gas-turbine system in accordance with the present invention can be increased to 80% from 20% in the conventional energy storage gas-turbine system.

In order to attain the second object described above, an energy storage gas-turbine electric power generating system in accordance with the present invention comprises a compressor for compressing air; a liquid air storage tank for storing liquid air; a liquefaction/vaporizing facility for liquefying the air compressed by said compressor to produce the liquid air and vaporizing the liquid air stored in the liquid air storage tank; a combustor for generating a combusted gas by combusting the air vaporized by the liquefaction/ vaporizing facility and a fuel; a gas turbine driven by the combusted gas generated in the combustor; and a gas-turbine generator connected to the gas turbine for generating electric power. Further, the liquefaction/vaporizing facility comprises a cold energy regenerator for recovering heat to a solid heat storing medium and cooling the air compressed by the compressor and vaporizing the liquid air to be stored in the liquid air storage tank using the heat recovered in the solid heat storing medium, and the liquid air storage tank is arranged inside the cold energy regenerator.

According to the present invention described above, since the liquid air storage tank is arranged inside the cold heat regenerator, heat flow from the outside into the liquid air storage tank is interrupted by the cold energy regenerator and thereby there is an effect in that the energy storage efficiency can be increased by suppressing temperature increase of the liquid air stored in the liquid air storage tank. Further, since the heat storing medium of the cold energy regenerator is solid and accordingly a tank for storing the heat storing medium or the like is not necessary, there is an effect in that the liquefaction/vaporizing facility is simplified. Furthermore, since the heat storing medium of the cold energy regenerator is solid, there is an effect that the supporting structure of the liquid air storage tank can be improved when the liquid air storage tank is installed inside the cold energy regenerator.

Moreover, in order to attain the second object described above, an energy storage gas-turbine electric power generating system in accordance with the present invention comprises a compressor for compressing air; a liquid air storage tank for storing liquid air; a liquefaction/vaporizing facility for liquefying the air compressed by the compressor to produce the liquid air and vaporizing the liquid air stored in the liquid air storage tank; a combustor for generating a combusted gas by combusting the air vaporized by the liquefaction/vaporizing facility and a fuel; a gas turbine driven by the combusted gas generated in the combustor; and a gas-turbine generator connected to the gas turbine for generating electric power; and a cooling unit for cooling the air compressed by the compressor using the fuel to be supplied to the combustor.

According to the present invention described above, since the air compressed by the compressor is cooled using the cold energy of the fuel (for example, LNG stored in a liquid phase) to be supplied to the combustor, there is an effect in that the energy storage efficiency can be improved. That is, in a conventional gas-turbine electric power generating plant, the very low temperature fuel stored in liquid phase is heated and vaporized by exchanging heat with sea water to be supplied to the combustor. In the energy storage gas-turbine system, the cold energy of the fuel having been disposed to sea water is used for cooling the air and accordingly the energy storage efficiency is increased by the amount of the cold energy of the fuel having been disposed to sea water.

DETAILED DESCRIPTION OF THE PREFERRED EMBODIMENTS

First Embodiment

The thermal energy given to air in a combustor is converted into mechanical energy (rotation energy) by a gas turbine and a steam turbine corresponding to respective suitable temperature ranges, and converted into electric energy by motor generators. By doing so, the thermal efficiency becomes as high as 48%. However, when the inside of the gas turbine system (mainly, the compressor and the gas turbine) is examined, there is a possibility to increase the electric generating power. For instance, in a gas turbine system of generating power of 150 MW class, although the mechanical energy generated by the gas turbine is 300 MW which is twice as large as the electric generating power, nearly one-half of the mechanical energy is consumed as the power of the compressor. In order to obtain steam in the steam turbine system (mainly, a heat recovery steam generator and a steam turbine and a feed water pump), condensed water in liquid state is pressurized by the feed water pump. The electric power required for the feed water pump is several percentages of the electric power obtained by the steam turbine system at most. This value is largely different from that in a gas turbine system. This is because a large amount of mechanical energy is required in the compressor to compress the air of which the volume is largely changed corresponding to the pressure change. It is possible to increase the total electric generating power of the power station by largely reducing the energy required for the compressor.

In order to reduce the power of the compressor, firstly the compressor is rotated using surplus electric power during nighttime, and the air compressed by the compressor is liquefied and stored in a liquid air storage tank in liquid phase. Then, the liquid air (including liquid oxygen) is supplied to a combustor when power demand is particularly increased during daytime. The present embodiment is characterized by another compressing facility provided in a flow path where the air compressed by the compressor is liquefied and supplied to the liquid air storage tank, and the air compressed by the compressor is further compressed through a liquefaction process. Further, the present embodiment is characterized by an expansion turbine generator facility provided in a flow path where the liquid air is vaporized and supplied to the combustor, and electric power is generated using the vaporized air. Furthermore, the present embodiment is characterized by a heat exchanger facility inside a liquefaction/vaporizing facility divided into plural stages (for example, 3 stages).

Figure 1:
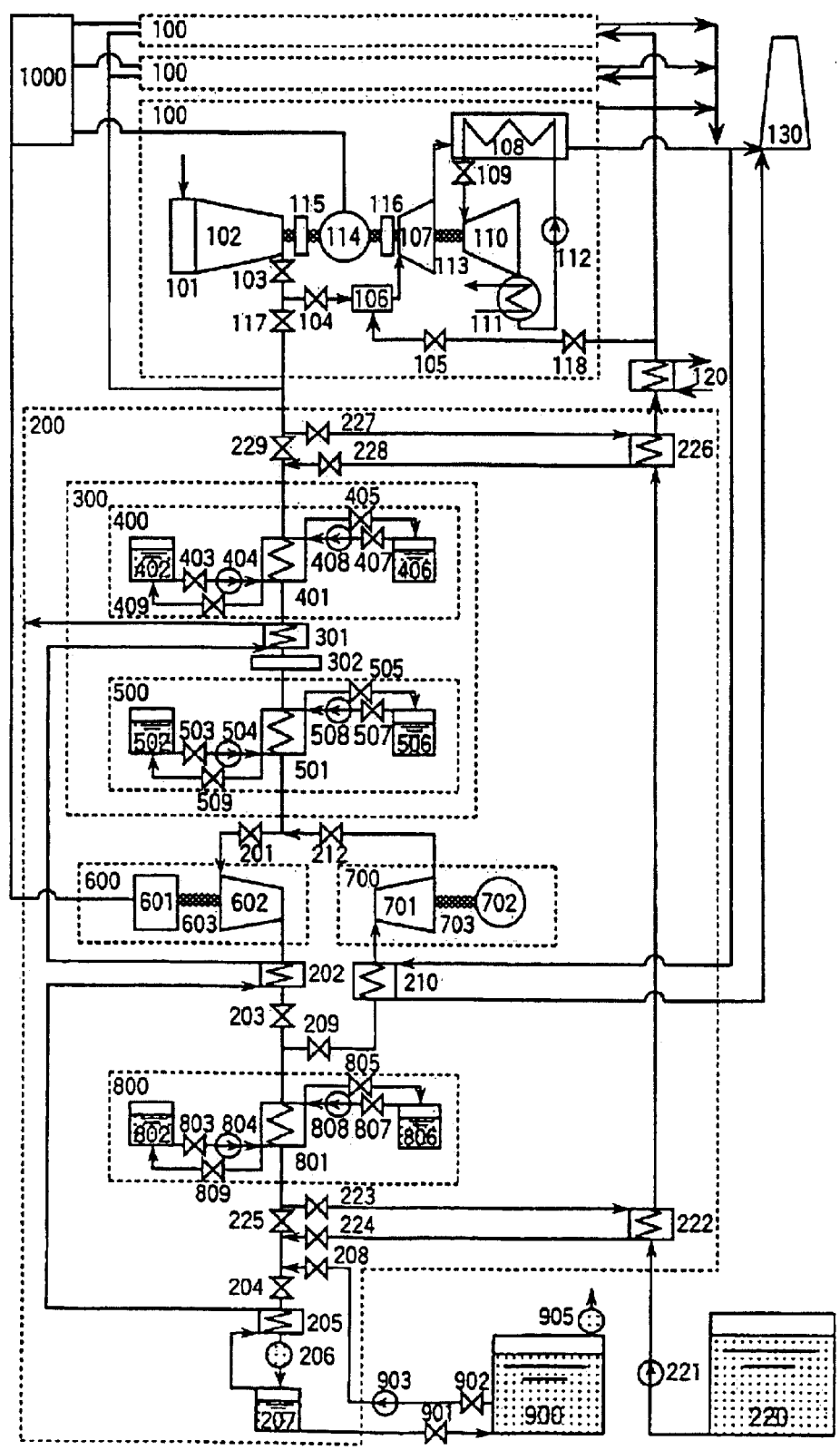
FIG. 1 is a diagram showing the mechanical systems of an embodiment of an energy storage gas-turbine electric power generating system in accordance with the present invention.

FIG. 1 is a diagram showing the mechanical systems of an embodiment of an energy storage gas-turbine electric power generating system in accordance with the present invention. Referring to FIG. 1, the reference character 100 indicates a gas-turbine electric power generating facility for generating electric power by a gas turbine 107, the reference character 101 indicates inlet guide vanes for controlling flow rate of air supplied to a compressor 102, the reference character 103 indicates an air shut-off valve for shutting off the air, the reference character 104 indicates an air shut-off valve for shutting off the air, the reference character 105 indicates a fuel control valve for controlling flow rate of fuel to be supplied to the combustor 106 for combusted gas by mixing and combusting the air and the fuel, the reference character 107 indicates the gas turbine driven by the combusted gas, the reference character 108 indicates a heat recovery steam generator for generating steam by heating water by exchanging heat with the combusted gas exhausted from the gas turbine 107 (hereinafter, referred to as "gas-turbine exhaust gas"), the reference character 109 indicates a steam regulating valve for controlling flow rate of steam (steam generated by the heat recovery steam generator 108) to be supplied to a steam turbine 110 driven by the steam, the reference character 111 indicates a condenser for condensing steam exhausted from the steam turbine 110 by exchanging heat with sea water or the like and storing the condensed water, the reference character 112 indicates a feed water pump for pressurizing the water (the condensed water stored in the condenser) to be supplied to the heat recovery steam generator, the reference character 113 indicates a turbine shaft, the reference character 114 indicates a motor generator for converting between mechanical energy and electric energy, the reference character 115 indicates a clutch for mechanically coupling and decoupling the turbine shaft 113, the reference character 116 indicates a clutch for mechanically coupling and decoupling the turbine shaft 113, the reference character 117 indicates an air shut-off valve for shutting off air, the reference character 118 indicates a fuel shut-off valve for shutting off fuel to be supplied to the combustor 106, the reference character 120 indicates a fuel vaporizer for vaporizing the fuel by exchanging heat with sea water or the like, the reference character 130 indicates a stack for ejecting the gas turbine exhaust gas exhausted from the heat recovery steam generator (hereinafter referred to as "boiler exhaust gas"), the reference character 200 indicates the liquefaction/vaporizing facility for liquefying the air compressed by the compressor 102 or vaporizing liquid air stored in a liquid air storage tank 900, the reference character 201 indicates an air shut-off valve for shutting off air, the reference character 202 indicates an intermediate temperature air cold energy recovery unit for recovering cold energy of air in gas phase from a low temperature air cold energy recovery unit, the reference character 203 indicates an air shut-off valve for shutting off air, the reference character 204 indicates an air shut-off valve for shutting off air, the reference character 205 indicates the low temperature air cold energy recovery unit for recovering cold energy of air in gas phase separated in a gas-liquid separator 207, the reference character 206 indicates an expansion valve for expanding air cooled by the low temperature air cold energy recovery unit 205, the reference character 207 indicates the gas-liquid separator for separating the air of a gas and liquid mixture into gas and liquid, the reference character 208 indicates an air shut-off valve for shutting off air, the reference character 209 indicates an air shut-off valve for shutting off air, the reference character 210 indicates the air heater for heating air to be supplied to an expansion turbine electric power generating facility 700, the reference character 212 indicates an air shut-off valve for shutting off air, the reference character 220 indicates a fuel storage tank for storing the fuel to be supplied to the combustor 106, the reference character 221 indicates a fuel pump for pressurizing the fuel (the fuel stored in the fuel storage tank 220) to be supplied to the combustor 106, the reference character 222 indicates a fuel cold energy recovery unit for recovering cold energy of the fuel to be supplied to the combustor 106, the reference character 223 indicates an air shut-off valve for shutting off air, the reference character 224 indicates an air shut-off valve for shutting off air, the reference character 225 indicates an air shut-off valve for shutting off air, the reference character 226 indicates a fuel cold energy recovery unit for recovering cold energy of the fuel to be supplied to the combustor 106, the reference character 227 indicates an air shut-off valve for shutting off air, the reference character 228 indicates an air shut-off valve for shutting off the air, the reference character 229 indicates an air shut-off valve for shutting off air, the reference character 300 indicates the high temperature heat exchanging facility for cooling the air compressed by the compressor 102 and heating air expanded by the expansion turbine electric power generating facility 700, the reference character 301 indicates a high temperature air cold energy recovery unit for recovering cold energy of the air in a gas phase heated by the intermediate temperature air cold energy recovery unit, the reference character 302 indicates a filter for removing solid objects and dust contained in the air cooled in the high temperature heat exchanging facility 400, the reference character 400 indicates the high temperature heat exchanging facility for cooling the air compressed by the compressor 102 and heating the air heated by the intermediate temperature heat exchanging facility 500, the reference character 401 indicates a high temperature heat exchanger for cooling the air compressed by the compressor 102 and heating the air heated by the intermediate temperature heat exchanging facility 500, the reference character 402 indicates a low temperature heat medium tank for storing a first heat storing medium (hereinafter, referred to as "heat medium") of low temperature, the reference character 403 indicates a heat medium shut-off valve for shutting off the first heat medium of low temperature, the reference character 404 indicates a heat medium pump for pressurizing the first heat medium of low temperature stored in the low temperature heat medium tank 402, the reference character 405 indicates a heat medium shut-off valve for shutting off a first heat medium of high temperature, the reference character 406 indicates the high temperature heat medium tank for storing the first heat medium of high temperature, the reference character 407 indicates a heat medium shut-off valve for shutting off the first heat medium of high temperature, the reference character 408 indicates a heat medium pump for pressurizing the first heat medium of high temperature stored in the high temperature heat medium tank 406, the reference character 409 indicates a heat medium shut-off valve for shutting off the first heat medium of low temperature, the reference character 500 indicates an intermediate temperature heat exchanging facility for cooling the air cooled by the high temperature heat exchanging facility 400 and heating the air expanded in the expansion turbine electric power generating facility 700, the reference character 501 indicates an intermediate temperature heat exchanger for cooling the air cooled by the high temperature heat exchanging facility 400 and heating the air expanded by the expansion turbine electric power generating facility 700, the reference character 502 indicates a low temperature heat medium tank for storing a second heat medium of low temperature, the reference character 503 indicates a heat medium shut-off valve for shutting off the second heat medium of low temperature, the reference character 504 indicates a heat medium pump for pressurizing the second heat medium of low temperature stored in the low temperature heat medium tank 502, the reference character 505 indicates a heat medium shut-off valve for shutting off a second heat medium of high temperature, the reference character 506 indicates the high temperature heat medium tank for storing the second heat medium of high temperature, the reference character 507 indicates a heat medium shut-off valve for shutting off the second heat medium of high temperature, the reference character 508 indicates a heat medium pump for pressurizing the second heat medium of high temperature stored in the intermediate temperature heat medium tank 506, the reference character 509 indicates a heat medium shut-off valve for shutting off the second heat medium of low temperature, the reference character 600 indicates a compressing facility for compressing the air cooled by the high temperature heat exchanging facility 300, the reference character 601 indicates a motor for driving a turbine shaft 603, the reference character 602 indicates a compressor for compressing the air cooled by the high temperature heat exchanging facility 300, the reference character 603 indicates a turbine shaft, the reference character 800 indicates a low temperature heat exchanging facility for cooling the air compressed by the compressing facility 600 and heating the liquid air pressurized by a liquid air pump 903, the reference character 700 indicates an expansion turbine electric power generating facility for generating electric power by expanding the air heated and vaporized by the low temperature heat exchanging facility 800, the reference character 701 indicates an expansion turbine driven by expansion of the air heated and vaporized by the low temperature heat exchanging facility 800, the reference character 702 indicates a generator for generating electric power, connected to the expansion turbine 701 by a turbine shaft 703 and driven by the expansion turbine 701, the reference character 801 indicates a low temperature heat exchanger for cooling the air compressed by the compressing facility 600 and heating the liquid air pressurized by a liquid air pump 903, the reference character 802 indicates a low temperature heat medium tank for storing a third heat medium of low temperature, the reference character 803 indicates a heat medium shut-off valve for shutting off the third heat medium of low temperature, the reference character 804 indicates a heat medium pump for pressurizing the third heat medium of low temperature stored in the low temperature heat medium tank 802, the reference character 805 indicates a heat medium shut-off valve for shutting off a third heat medium of high temperature, the reference character 806 indicates the high temperature heat medium tank for storing the third heat medium of high temperature, the reference character 807 indicates a heat medium shut-off valve for shutting off the third heat medium of high temperature, the reference character 808 indicates a heat medium pump for pressurizing the third heat medium of high temperature stored in the high temperature heat medium tank 806, the reference character 809 indicates a heat medium shut-off valve for shutting off the third heat medium of low temperature, the reference character 900 indicates a liquid air storage tank for storing the liquid air, the reference character 901 indicates a liquid air shut-off valve for shutting off the liquid air, the reference character 902 indicates a liquid air shut-off valve for shutting off the liquid air, the reference character 903 indicates a liquid air pump for pressurizing the liquid air stored in the liquid air storage tank 900, the reference character 905 indicates a safety valve for depressurizing the pressure in the liquid air storage tank 900, and the reference character 1000 indicates a surplus electric power supply unit for supplying electric power to the gas-turbine electric power generating facility 100 and the compressing facility 600 using surplus electric power (electric power obtained by subtracting electric power demand from electric power generated by the nuclear power stations and the steam power stations).

The energy storage gas-turbine system of the present embodiment has three gas turbine electric power generating systems 100 to one liquefaction/vaporizing facility 200 and one liquid air storage tank 900. Therein, the number of the gas-turbine systems 100 may be one or more than four (for instance, 6 to 12 systems).

Further, it is possible that one liquefaction/vaporizing facility 200 is provided, corresponding to each of the plurality of gas turbine systems 100, and one liquid air storage tank 900 is provided for the plurality of the gas turbine systems 100 and liquefaction/vaporizing facility 200. That is, the plurality of gas turbine systems 100 and the liquefaction/vaporizing facility 200 can jointly use the one liquid air storage tank 900.

Operating modes of the energy storage gas-turbine system of the present embodiment can be classified into three modes, that is, (1) normal electric power generating mode, (2) energy charging mode, and (3) energy discharging electric power generating mode.

In (1), the normal electric power generating mode, both of the clutch 115 and the clutch 116 are brought into a closed state, and the compressor 102 and the motor generator 114 and the gas turbine 107 (and the steam turbine 110) are connected with the turbine shaft 113. Then, the air compressed by the compressor 102 is supplied to the combustor 106 by bringing the air shut-off valve 103 and the air shut-off valve 104 into an opened state and bringing the air shut-off valve 117 into a closed state. After that, the motor generator 114 is driven to generate electric power and the compressor 102 is driven by driving the gas turbine 107 and the steam turbine 110. During start-up (in a period from the time when the gas turbine 107 starts to rotate to the time when the gas turbine reaches a predetermined rotation speed), the compressor 102 and the gas turbine 107 are driven by supplying electric power to the motor generator 114 from the surplus electric power supply unit 1000 or the like to drive the motor generator 114. This normal electric power generating mode is performed during daytime on weekdays when electric power demand is large.

In (2), the energy charging mode, the clutch 115 is brought into a closed state and the clutch 116 is brought into an opened state, and the compressor 102 and the motor generator 114 are coupled by the turbine shaft 113. On the other hand, the motor generator 114 and the gas turbine 107 (and the steam turbine 110) are decoupled. Then, the air compressed by the compressor 102 is supplied to the liquefaction/vaporizing facility to generate liquid air by bringing the air shut-off valve 103 and the air shut-off valve 117 into an opened state, and bringing the air shut-off valve 104 into a closed state. The produced liquid air is stored in the liquid air storage tank 900. At that time, the compressor 102 is driven by supplying electric power to the motor generator 114 from the surplus electric power supply unit 1000 to drive the motor generator 114. The gas turbine 107 and the steam turbine 110 are in a stopped state. The operation of the energy charging mode is performed during nighttime on weekdays and on holidays when electric power demand is small and surplus electric power is generated. Therein, part of the electric power generated by the other gas-turbine electric power generating facility 100 may be supplied as the power to the motor generator 114. In the gas-turbine electric power generating facility 100, LNG is often used as the fuel. The LNG is generally stored in the fuel storage tank 220 in liquid state at a very low temperature. Since it is impossible to completely prevent heat from entering into the fuel storage tank 220 from the outside, some amount of the LNG is always vaporized to produce flammable gas. Therefore, part of the plurality of gas-turbine electric power generating facilities 100 is sometimes operated even during nighttime on weekdays and on holidays when electric power demand is small.

In (3), the energy discharging electric power generating mode, the clutch 115 is brought into an opened state and the clutch 116 is brought into a closed state, and the motor generator 114 and the gas turbine 107 (and the steam turbine 110) are coupled by the turbine shaft 113. On the other hand, the compressor 102 and the motor generator 114 are decoupled. Then, the air shut-off valve 103 is brought into a closed state, and the air shut-off valve 104 and the air shut-off valve 117 are brought into an opened state. The liquid air stored in the liquid air storage tank 900 is vaporized in the liquefaction/vaporizing facility to be supplied to the combustor 106. Then, the gas turbine 107 and the steam turbine 110 are driven to generate electric power by driving the motor generator 114. Therein, the compressor 102 is stopped. This operation of the energy discharging electric power generating mode is performed instead of operation of the normal electric power generating mode. That is, the operation of the energy discharging electric power generating mode is performed during daytime on weekdays when electric power demand is large.

In the operation of the energy storage gas-turbine system of the present embodiment, it is not necessary to independently perform each of the modes, (1) the normal electric power generating mode, (2) the energy charging mode, and (3) the energy discharging electric power generating mode. That is, the energy storage gas-turbine system may be operated by combining (1) the normal electric power generating mode and (2) the energy charging mode. The energy storage gas-turbine system may be operated by combining (1) the normal electric power generating mode and (3) the energy discharging electric power generating mode. The combined mode operation described above may be performed using one of the gas-turbine electric power generating facilities 100, or using a plurality of the gas-turbine electric power generating facilities 100. Therein, the combined mode operation using a plurality of the gas-turbine electric power generating facilities 100 means that a part of the plurality of the gas-turbine electric power generating facilities 100 are operated in (1) the normal electric power generating mode, and the other part of the plurality of the gas-turbine electric power generating facilities 100 are operated in (2) the energy charging mode. The combined mode operation using a plurality of the gas-turbine electric power generating facilities 100 also means that a part of the plurality of the gas-turbine electric power generating facilities 100 are operated in (1) the normal electric power generating mode, and the other part of the plurality of the gas-turbine electric power generating facilities 100 are operated in (3) the energy discharging electric power generating mode.

In a case where the combined mode operation is performed using one of the gas-turbine electric power generating facilities 100, the air shut-off valve 104 is exchanged to the air control valve 119 for controlling an air flow rate and/or the air shut-off valve 117 is exchanged to the air control valve 121. Otherwise, the air control valve 119 is arranged between the air shut-off valve 104 and the combustor 106, and/or the air control valve 121 is arranged between the air shut-off valve 117 and the liquefaction/vaporizing facility 200.

In a case where the energy storage gas-turbine system is operated by combining (1) the normal electric power generating mode and (2) the energy charging mode, by coupling both of the clutch 115 and the clutch 116, the compressor 102 and the motor generator 114 and the gas turbine 107 (and the steam turbine 110) are coupled by the turbine shaft 113. Then, the air shut-off valve 103 is brought into an opened state to supply the air compressed by the compressor 102 to the combustor 106 through the air control valve 119 and to the liquefaction/vaporizing facility 200 through the air control valve 121. The flow rate of the air supplied to the combustor 106 and the flow rate of the air supplied to the liquefaction/vaporizing facility 200 are controlled by the air control valve 119 and/or the control valve 121. By driving the gas turbine 107 and the steam turbine 110, the motor generator 114 is driven to generate electric power and the compressor 102 is driven.

In a case where the energy storage gas-turbine system is operated by combining (1) the normal electric power generating mode and (3) the energy discharging electric power generating mode, by coupling both of the clutch 115 and the clutch 116, the compressor 102 and the motor generator 114 and the gas turbine 107 (and the steam turbine 110) are coupled by the turbine shaft 113. Then, the air shut-off valve 103 is brought into an opened state to supply the air compressed by the compressor 102 to the combustor 106 through the air control valve 119. The air vaporized by the liquefaction/vaporizing facility 200 is supplied to the combustor 106 through the air control valve 121. The flow rate of the air compressed by the compressor 102 and the flow rate of the air vaporized by the liquefaction/vaporizing facility 200 are controlled by the air control valve 119 and/or the control valve 121. By driving the gas turbine 107 and the steam turbine 110, the motor generator 114 is driven to generate electric power and the compressor 102 is driven.

By performing the combined mode operation of (1) the normal electric power generating mode and (3) the energy discharging electric power generating mode at starting period of the gas-turbine electric power generating facilities 100, it is possible to reduce an amount of electric power supplied to the motor generator 114 from the surplus electric power supply facility 1000.

In the gas-turbine electric power generating facilities 100, the gas turbines 107 (and the steam turbine 110) are driven to generate electric power.

In the axial compressor 102, air (for example, atmospheric air) is compressed up to 15 atmospheric pressure. At that time, temperature of the air is increased up to 320° C. to 350° C. The inlet guide vanes 101 are formed in the air inlet port side of the compressor 102. The opening degree of the inlet guide vanes 101 is controlled depending on an operating condition (starting of operation, rated operation, stopping of operation and so on) of the gas turbine electric power generating facility 100 or a generating electric power or a load of the generator 114 to control the flow rate of the air flowing into the compressor 102. The air compressed by the compressor 102 is passed through the air shut-off valve 103, and then supplied to the combustor 106 through the air shut-off valve 104 during the normal electric power generating mode, and supplied to the liquefaction/vaporizing facility 200 through the air shut-off valve 117 during the energy charging mode.

On the other hand, the fuel (for example, LNG, petroleum) is stored in the fuel storage tank 220 in liquid state. During operation of the normal electric power generating mode and the energy discharging electric power generating mode, the fuel stored in the fuel storage tank 220 is pressurized in the fuel pump 221. The pressurized fuel is supplied to the fuel vaporizing unit 120. In the fuel vaporizing unit 120, the pressurized fuel is heated by exchanging heat with sea water to be vaporized. The vaporized fuel is supplied to the combustor 106 through the fuel shut-off valve 118 and the fuel control valve 105. In the combustor 106, the fuel is mixed with the air compressed by the compressor 102 in the normal electric power generating mode or the air vaporized by the liquefaction/vaporizing facility 200 in the energy discharging electric power generating mode and combusted to be generated combustion gas. Temperature of the combustion gas is, for example, 1200° C. to 1500° C.

The combustion gas is supplied to the gas turbine 107 to be expanded. The gas turbine 107 is driven in the expanding process of the combustion gas (rotates the turbine shaft 113). The gas turbine exhaust gas (the temperature is generally nearly 600° C.) is supplied to the heat recovery steam generator 108. In the heat recovery steam generator 108, water is heated and steam is generated by performing heat exchange between the gas turbine exhaust gas and the water. The steam is supplied to the steam turbine through the steam regulating valve 109 to be expanded. The steam turbine 110 is driven in the expanding process of the steam (rotates the turbine shaft 113). The steam turbine 110 is connected to the condenser 111 inside which is nearly in a vacuum state. The steam from the steam turbine 110 is supplied to the condenser 111, and condensed by performing heat exchange with sea water or the like inside the condenser 111 and the condensed water is stored in the condenser 111. The condensed water stored in the condenser 111 is pressurized by the feed water pump 112 and supplied to the heat recovery steam generator 108 again.

The compressor 102 and the generator 114 and the gas turbine 107 and the steam turbine 110 are mechanically coupled by the turbine shaft 113. In the generator 114, the mechanical energy (the rotation energy of the turbine rotor 113) is converted into electric energy to generate electric power.

On the other hand, the gas turbine exhaust gas after exchanging heat with the water is passed though the catalyst bed in the heat recovery steam generator where nitric oxide contained in the gas turbine exhaust gas is decomposed into harmless oxygen and nitrogen. The boiler exhaust gas (the temperature is generally nearly 100_) is supplied to the stack 130 together with boiler exhaust gas from the other gas turbine electric power generating facilities. Through the stack 130, the boiler exhaust gas is ejected to the atmosphere.

In the liquefaction/vaporizing facility 200, the air compressed by the compressor 102 is liquefied during the energy charging mode (liquefaction process). On the other hand, in the liquefaction/vaporizing facility 200, the liquid air in the liquid air storage tank 900 is vaporized during the energy discharging electric power generating mode (vaporizing process).

Operation of the liquefaction/vaporizing facility 200 during the energy charging mode will be described first. The air compressed by the compressor 102 is supplied to the high temperature heat exchanging facility 300 through the air shut-off valve 229. In the high temperature heat exchanging facility 300, the air compressed by the compressor 102 is cooled. The high temperature heat exchanging facility 300 comprises the high temperature heat exchanging facility 400 and the intermediate temperature heat exchanging facility 500.

In high temperature heat exchanging facility 400, the first heat medium (for example, machine oil or the like) of low temperature stored in the low temperature heat medium tank 402 is passed through the heat medium shut-off valve 403 and pressurized by the heat medium pump 404 to be supplied to the high temperature heat exchanger 401 of a counter-flow type. In the high temperature heat exchanger 401, the air compressed by the compressor 102 is cooled by performing heat exchange between the first heat medium of low temperature exchange heat and the air compressed by the compressor 102. The first heat medium heated to a high temperature by the high temperature heat exchanger 401 is supplied to the high temperature heat medium tank 406 through the heat medium shut-off valve 405. In the high temperature heat medium tank 406, the first heat medium of high temperature is stored. At that time, operation of the heat medium pump 408 is stopped, and the heat medium shut-off valve 407 and the heat medium shut-off valve 409 are kept closed. The air cooled by the high temperature heat exchanging facility 400 is further cooled by the high temperature air cold heat recovery unit 301 and then supplied to the filter 302.

In the filter 302, solid objects and dust contained in the air cooled by the high temperature air cold heat recovery unit 301 are removed. The air compressed by the compressor 102 contains moisture and carbon dioxide. The moisture and carbon dioxide are solidified in the liquefying process of the air to form the solid objects which may block the piping of the air and the like. Therefore, it is preferable to arrange the filter 302 at a place in an appropriate temperature range (for example, at a place between the high temperature heat exchanging facility 400 and the intermediate temperature heat exchanging facility 500, at a place between the intermediate temperature heat exchanging facility 500 and the compressing facility 600, at a place between the compressing facility 600 and the low temperature heat exchanging facility 800, and so on). The air from the filter 302 is supplied to the intermediate temperature heat exchanging facility 500.

In the intermediate temperature heat exchanging facility 500, the second heat medium (for example, propane or the like) of low temperature stored in the low temperature heat medium tank 502 is passed through the heat medium shut-off valve 503 and pressurized by the heat medium pump 504 to be supplied to the intermediate temperature heat exchanger 501 of a counter-flow type. In the intermediate temperature heat exchanger 501, the air from the filter 302 is cooled by performing heat exchange between the second heat medium of low temperature exchange heat and the air from the filter 302. The second heat medium heated up to a high temperature by the intermediate temperature heat exchanger 501 is supplied to the high temperature heat medium tank 506 through the heat medium shut-off valve 505. The second heat medium of high temperature is stored in the high temperature heat medium tank 506. At that time, the heat medium pump 508 is kept stopped, and the heat medium shut-off valve 507 and the heat medium shut-off valve 509 are closed. The air cooled by the high temperature heat exchanging facility 300 (the air cooled by the intermediate temperature heat exchanging facility 500) is supplied to the compressing facility 600 through the air shut-off valve 201.

In the compressing facility 600, the motor 601 and the compressor 602 are coupled by the turbine shaft 603. The compressor 602 is driven by supplying electric power from the surplus electric power supply unit 1000 to the motor 601 to drive the motor 601. In the compressor 602, the air cooled by the high temperature heat exchanging facility 300 is compressed up to a predetermined pressure necessary for liquefaction (for example, above 38 atmospheres). If the predetermined pressure is, for example, 40 atmospheres, temperature of the air is raised up to approximately −70° C. by the compression. The air compressed by the compressing facility 600 (the air compressed by the compressor 602) is further cooled by the intermediate temperature air cold heat recovery unit 202, and then supplied to the low temperature heat exchanging facility 800 through the air shut-off valve 203. At that time, the expansion turbine electric power generating facility 700 is kept stopped, and the air shut-off valve 209 and the air shut-off valve 212 are closed.

In the low temperature heat exchanging facility 800, the third heat medium (for example, propane or the like) of low temperature stored in the low temperature heat medium tank 802 is passed through the heat medium shut-off valve 803 and pressurized by the heat medium pump 804 to be supplied to the low temperature heat exchanger 801 of a counter-flow type. In the low temperature heat exchanger 801, the air cooled by the intermediate temperature air cold heat recovery unit 202 is cooled up to approximately −170° C. by performing heat exchange between the third heat medium of low temperature exchange heat and the air cooled by the intermediate temperature air cold heat recovery unit 202. The third heat medium heated to a high temperature by the low temperature heat exchanger 801 is supplied to the high temperature heat medium tank 806 through the heat medium shut-off valve 805. The third heat medium of high temperature is stored in the high temperature heat medium tank 806. At that time, the heat medium pump 808 is kept stopped, and the heat medium shut-off valve 807 and the heat medium shut-off valve 809 are closed. The air cooled by the low temperature heat exchanging facility 800 is passed through the air shut-off valves 225 and 204, and further cooled by the low temperature air cold heat recovery unit 205, and then supplied to the expansion valve 206.

In the expansion valve 206, the air cooled by the low temperature air cold heat recovery unit 205 is expanded up to 1 atmosphere. At that time, nearly 80% of the air is liquefied by the Joule-Thomson effect. The air of a mixture of gas (20%) and liquid (80%) is supplied to the gas-liquid separator 207. In the gas-liquid separator 207, the air in gas phase (gas-phase air) and the air in liquid phase (liquid air) are separated from each other. The liquid air is supplied to the liquid air storage tank 900 through the liquid air shut-off valve 901. At that time, the liquid air pump 903 is kept stopped, and the liquid air shut-off valve 208 and the liquid air shut-off valve 902 are closed.

On the other hand, temperature of the gas-phase air is approximately −190° C., and the cold heat of the gas-phase air is recovered by supplying it to an appropriate position of the air liquefaction process to perform heat exchange with air in the liquefaction process. That is, the gas-phase air in the gas-liquid separator 207 is supplied to the low temperature air cold heat recovery unit 205 to cool the air cooled by the low temperature heat exchanging facility 800. The gas-phase air heated by the low temperature air cold heat recovery unit 205 is supplied to the intermediate temperature air cold heat recovery unit 202 to cool the air compressed by the compressing facility 600. The air heated by the intermediate temperature air cold heat recovery unit 202 is supplied to the high temperature air cold heat recovery unit 301 to cool the air cooled by the high temperature heat exchanging facility 300. The air heated by the high temperature air cold heat recovery unit 301 is ejected to the atmosphere.

The liquid air is stored in the liquid air storage tank 900. Since the liquid air storage tank 900 stores the liquid air in an atmospheric pressure (1 atmosphere) state, there are few problem on strength and safety. When the gas turbine electric power generating facility 100 is in a stopped state and during the normal electric power generating mode operation, both of the liquid air shut-off valve 901 and the liquid air shut-off valve 902 are closed. It is preferable that the liquid air storage tank 900 is a large cylindrical tank made of a stainless steel. Further, it is preferable that the outer periphery of the liquid air storage tank 900 is of a multiple-insulating structure. By doing so, it is possible to suppress entering of heat from the external. Furthermore, temperature rise of the liquid air stored in the liquid air storage tank 900 is suppressed using the latent heat of the liquid air stored in the liquid air storage tank 900. It is preferable that the generated gas-phase air is ejected to the atmosphere through the safety valve 905.

Operation of the liquefaction/vaporizing facility 200 during the energy discharging electric power generating mode will be described below. The liquid air stored in the liquid air storage tank 900 is passed through the liquid air shut-off valve 902, and pressurized by the liquid air pump 903, and then supplied to the liquefaction/vaporizing facility 200. At that time, the liquid air shut-off valve 901 is closed. In the liquid air pump 903, the liquid air stored in the liquid air storage tank 900 is pressurized up to a pressure (for example, 200 atmospheres) higher than a pressure of the air (for example, 10 to 15 atmospheres) supplied to the combustor 106. In general, energy required for compressing (pressurizing) a liquid is nearly several percentages of the energy required for compressing a gas. That is, energy required for compressing (pressurizing) a liquid is negligibly small compared to energy required for compressing a gas.

In the liquefaction/vaporizing facility 200, the liquid air pressurized by the liquid air pump 903 is supplied to the low temperature heat exchanging facility 800 through the liquid air shut-off valve 208 and the air shut-off valve 225. At that time, the air shut-off valve 204 is closed.

In the low temperature heat exchanging facility 800, the third heat medium of high temperature stored in the high temperature heat medium tank 806 is passed through the heat medium shut-off valve 807, and pressurized by the heat medium pump 808, and then supplied to the low temperature heat exchanger 801. In the low temperature heat exchanger 801, the liquid air pressurized by the liquid air pump 903 is heated and vaporized by performing heat exchange between the third heat medium of high temperature exchange heat and the liquid air pressurized by the liquid air pump 903. At that time, temperature of the heated liquid air is approximately 15° C. The heat medium cooled to a low temperature by the low temperature heat exchanger 801 is supplied to the low temperature heat medium tank 802 through the heat medium shut-off valve 809. The third heat medium of high temperature is stored in the low temperature heat medium tank 802. At that time, the heat medium pump 804 is stopped, and the heat medium shut-off valve 803 and the heat medium shut-off valve 805 are closed. Then, the air heated and vaporized by the low temperature heat exchanging facility 800 is supplied to the air heater 210 through the air shut-off valve 209. At that time, the air shut-off valve 203 is closed.

In the air heater 210, the air heated and vaporized by the low temperature heat exchanging facility 800 is further heated by performing heat exchange between the boiler exhaust gas exchange heat and the air heated by the low temperature heat exchanging facility 800. By doing so, energy capable of being recovered by the expansion turbine electric power generating facility 700 (electric energy generated by the generator 702) can be increased. The boiler exhaust gas cooled by the air heater 210 is supplied to the stack 130 to be ejected to the atmosphere. Instead of the boiler exhaust gas or together with the boiler exhaust gas, the air heated and vaporized by the low temperature heat exchanging facility 800 may be heated by supplying at least one of the gas turbine exhaust gas, the air after cooling the rotating blades or the stationary blades of the gas turbine 107, atmospheric air, the air supplied to the compressor 102, the intermediate air in the middle process of compression inside the compressor 102, sea water, the sea water supplied to the condenser 111, the sea water discharged from the condenser 111 and so on (hereinafter, referred to as "gas turbine exhaust heat"). On the other hand, the air heated by the air heater 210 is supplied to the expansion turbine electric power generating facility 700.

In the expansion turbine electric power generating facility 700, the expansion turbine 701 and the generator 702 are coupled by the turbine rotor 703. In the expansion turbine 701, the air heated by the air heater 210 is expanded up to a pressure (for example, 10 to 15 atmospheres) necessary for the air to be supplied to the combustor 106. The expansion turbine 701 is driven by the heated air in an expansion process. By this process, the generator 702 connected to the expansion turbine 701 with the turbine rotor 703 is driven. In the generator 702, the mechanical energy (the rotation energy of the turbine rotor 703) is converted into electric energy to generate electric power. The air expanded in the expansion turbine electric power generating facility 600 (the air expanded in the expansion turbine 701) is supplied to the high temperature heat exchanging facility 300 through the air shut-off valve 212. At that time, the compressing facility 600 is kept stopped, and the air shut-off valve 201 is closed.

Therein, assuming that, for example, the air having temperature of 15° C. and pressure of 200 atmospheres is expanded to pressure of 10 atmospheres (at this time, the temperature becomes −140° C.), it is possible to recover energy of approximately 30% of the energy required in the energy charging mode operation (mainly, driving power of the compressor 102 and the compressor 602, that is, the electric energy supplied from the surplus electric power supply unit 1000 to the motor generator 114 and the motor 601). That is, it is possible to recover energy of approximately ⅓ of the energy required for compressing air at room temperature to 10 atmospheres.

In the high temperature heat exchanging facility 300, the air expanded by the expansion turbine electric power generating facility 700 is heated. In the intermediate temperature heat exchanging facility 500, the second heat medium of high temperature stored in the high temperature heat medium tank 506 is passed through the heat medium shut-off valve 507, and pressurized by the heat medium pump 508 to be supplied to the intermediate temperature heat exchanger 501. In the intermediate temperature heat exchanger 501, the air expanded in the expansion turbine electric power generating facility 700 is heated by performing heat exchange between the second heat medium of high temperature exchange heat and the air expanded in the expansion turbine electric power generating facility 700. The second heat medium cooled to a low temperature by the intermediate temperature heat exchanger 501 is supplied to the low temperature heat medium tank 502 through the heat medium shut-off valve 509. The second heat medium of low temperature is stored in the low temperature heat medium tank 502. At that time, the heat medium pump 504 is kept stopped, and the heat medium shut-off valve 503 and the heat medium shut-off valve 505 are closed. The air heated by the intermediate temperature heat exchanging facility 500 is passed through the filter 302 and the high temperature air cold heat recovery unit 301 to be supplied to the high temperature heat exchanging facility 400. Therein, the air heated by the intermediate temperature heat exchanging facility 500 may be directly supplied to the high temperature heat exchanging facility 400 and not pass through the filter 302 and the high temperature air cold heat recovery unit 301.

In the high temperature heat exchanging facility 400, the first heat medium of high temperature stored in the high temperature heat medium tank 406 is passed through the heat medium shut-off valve 407, and pressurized by the heat medium pump 408 to be supplied to the high temperature heat exchanger 401. In the high temperature heat exchanger 401, the air heated by the intermediate temperature heat exchanging facility 500 is heated by performing heat exchange between the first heat medium of high temperature exchanges heat and the air heated by the intermediate temperature heat exchanging facility 500. Temperature of the heated air is approximately, for example, 320° C. to 350° C. The first heat medium cooled to a low temperature by the high temperature heat exchanger 401 is supplied to the low temperature heat medium tank 402 through the heat medium shut-off valve 409. The first heat medium of low temperature is stored in the low temperature heat medium tank 402. At that time, the heat medium pump 404 is kept stopped, and the heat medium shut-off valve 403 and the heat medium shut-off valve 405 are closed. Then, the air heated by the high temperature heat exchanging facility 300 (the air heated by the high temperature heat exchanging facility 400) is supplied to the gas turbine electric power generating facility 100 through the air shut-off valve 229.

In the gas turbine electric power generating facility 100, the air evaporated by the liquefaction/vaporizing facility (the air heated by the high temperature heat exchanging facility 200, that is, the air heated by the high temperature heat exchanging facility 400) is supplied to the combustor 106 through the air shut-off valve 117 and the air shut-off valve 104.

It is preferable that in the liquefaction/vaporizing facility 200, the air compressed by the compressor 102 is cooled using the cold heat of the fuel to be supplied to the combustor 106. For example, as shown in FIG. 1, the fuel cold heat recovery units 222 and 226 are arranged between the fuel storage tank 220 and the combustor 106. The fuel cold heat recovery units 222 and 226 each are a counter-flow type heat exchanger. In the fuel pump 221, the fuel stored in the fuel storage tank 220 is pressurized. The pressurized fuel is supplied to the fuel cold heat recovery unit 222. On the other hand, the air cooled by the low temperature heat exchanging facility 800 is supplied to the fuel cold heat recovery unit 222 through the air shut-off valve 223. In the fuel cold heat recovery unit 222, the pressurized fuel is heated and at the same time the air cooled by the low temperature heat exchanging facility 800 is cooled by performing heat exchange between the pressurized fuel and the air cooled by the low temperature heat exchanging facility 800. The fuel heated by the fuel cold heat recovery unit 222 is supplied to the fuel cold recovery unit 226. On the other hand, the air cooled by the fuel cold heat recovery unit 222 is supplied to the low temperature air cold heat recovery unit 205 through the air shut-off valves 224 and 204. At this time, the air shut-off valve 225 is closed. Further, the air compressed by the compressor 102 is supplied to the fuel cold heat recovery unit 226 through the air shut-off valve 227. In the fuel cold heat recovery unit 226, heat exchanging between the fuel heated by the fuel cold heat recovery unit 222 and the air compressed by the compressor 102 is effected, the fuel heated by the fuel cold heat recovery unit 226 is heated and vaporized and the air compressed by the compressor 102 is cooled. The fuel heated by the fuel cold heat recovery unit 226 is supplied to the combustor 106 through the fuel vaporizer 120, the fuel shut-off valve 118 and the fuel control valve 105. On the other hand, the air cooled by the fuel cold heat recovery unit 226 is supplied to the high temperature heat exchanging facility 300 through the air shut-off valve 228. At this time, the air shut-off valve 229 is closed.

That is, the fuel stored in a liquid state of very low temperature in the fuel storage tank 220 is heated and vaporized by the fuel cold heat recovery units 222 and 226, and then supplied to the combustor 106. Therefore, it is preferable that the fuel heated by the fuel cold heat recovery unit 226 is supplied to the combustor 106 without passing through the fuel vaporizer 120, or the operation of the fuel vaporizer 120 is stopped. Further, the combustor 106 supplied with the fuel the cold heat of which is recovered by air may be a combustor 106 belonging to another of the gas turbine electric power generating facilities 100 operated in (1) the normal electric power generating mode different from the gas turbine electric power generating facility 100 operated in (2) the energy charging mode (supplying air to the liquefaction/vaporizing facility 200). Otherwise, the combustor 106 may be the only combustor 106 of the concerned gas turbine electric power generating facility 100 operated in the combined mode of (1) the normal electric power generating mode and (2) the energy charging mode. In other words, the concerned gas turbine electric power generating facility 100 supplies air to the liquefaction/vaporizing facility 200 and at the same time performs electric power generation using the fuel heated by the fuel cold heat recovery unit 222.

Further, the positions in which the fuel cold heat recovery units 222 and 226 are arranged are not limited to the position shown in FIG. 1. For example, the fuel cold heat recovery unit 222 can be arranged so as to cool the air compressed by the compressing facility 600. The cold heat recovery unit 226 can be arranged so as to cool the air cooled by the high temperature heat exchanging facility 400 or so as to cool the air cooled by the intermediate heat exchanging facility 500. Further, the cold heat recovery unit 222 can be arranged so as to bypass the low temperature heat exchanging facility 800. That is, the fuel cold heat recovery unit 222 cools the air compressed by the compressing facility 600 and supplies the cooled air to the low temperature air cold heat recovery unit 205. In the same manner, the fuel cold heat recovery unit 226 can be arranged so as to bypass the high temperature heat exchanging facility 300. That is, the fuel cold heat recovery unit 226 cools the air compressed by the compressor 102 and supplies the cooled air to the compressing facility 600.

Figure 2:
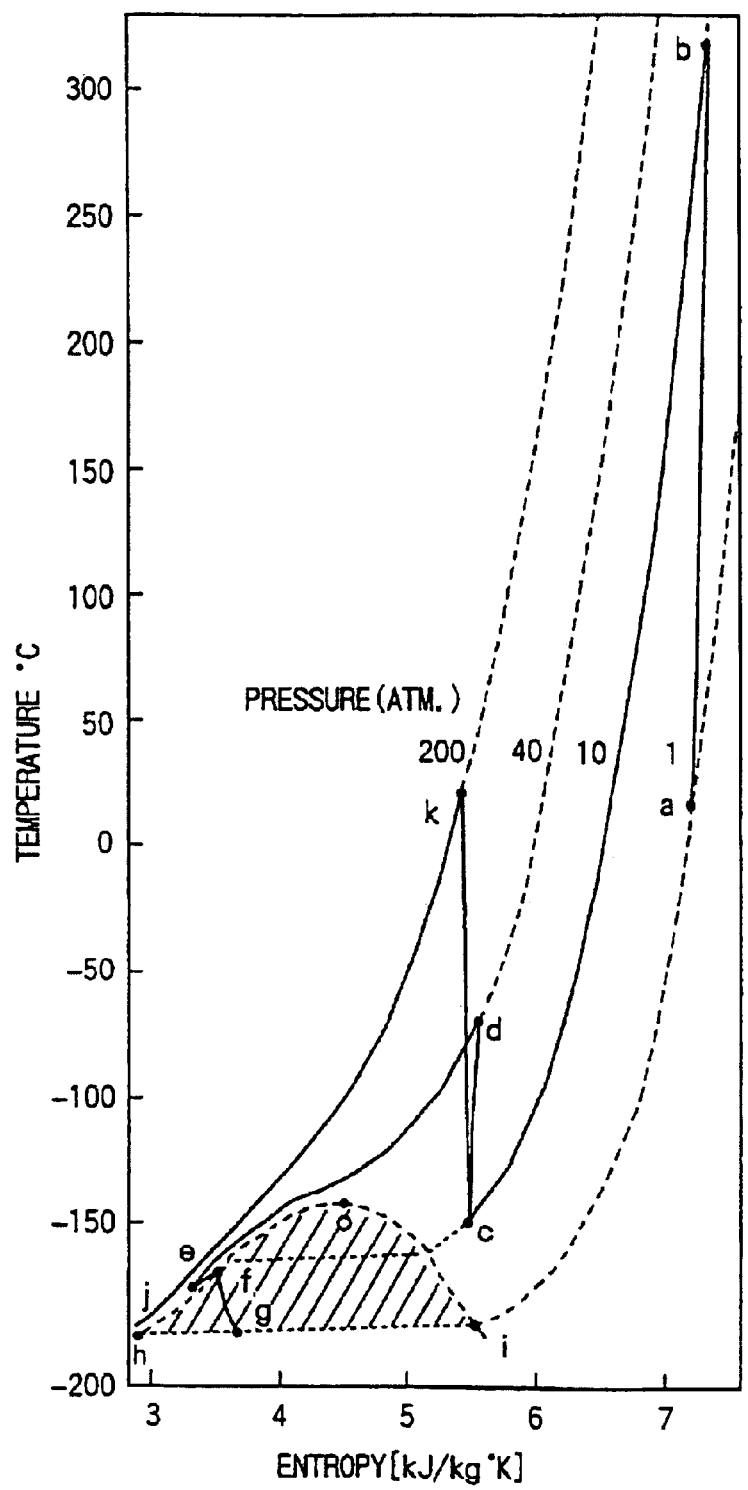
FIG. 2 is a diagram showing the property change of the process of an embodiment of an energy storage gas-turbine electric power generating system in accordance with the present invention.

Next, FIG. 2 is a diagram showing the property change of the process of an embodiment of an energy storage gas-turbine electric power generating system in accordance with the present invention. In general, the property of air at low temperature can be expressed by temperature and entropy as shown in FIG. 2. The zone surrounded by a dotted line hi and a dotted semi-sphere line hoi (hatched zone) is a mixed zone of liquid-phase and gas-phase, and state of air on the dotted line oh is saturated liquid and state of air on the dotted line oi is saturated gas. Isobaric property changes are shown for 200 atmospheres, 40 atmospheres, 10 atmospheres and 1 atmosphere.

In the liquefaction process, firstly in the compression process of the compressor 102, the air in the point a isentropically increases its pressure up to 10 atmospheres along the line from the point a to the point b. Then, in the high temperature heat exchanging facility 400 and in the intermediate temperature heat exchanging facility 300, the air isobarically decreases its temperature along the line from the point b to the point c. After that, in the compression process of the compressing facility 600, the air isentropically increases its pressure along the line from the point c to the point d. Then, in the cooling process of the low temperature heat exchanging facility 800, the air isobarically decreases its temperature along the line from the point d to the point e. After that, in the expansion process of the expansion valve 206, the air changes along the line from the point e, through the point f to the point g. Since the air at the point g is in a state of a mixture of liquid and gas, the mixture is separated into liquid air and gas-phase air in the gas-liquid separator 207. The liquid air (at the point h) is stored in the liquid air storage tank 900. The gas-phase air (at the point i) increases its temperature along the line from the point i to the point a in the low temperature air cold heat recovery unit 205 during the liquefaction process and in the heating process of the intermediate temperature air cold heat recovery unit 202 and the high temperature air cold heat recovery unit 301.

In the vaporizing process, the liquid air (at the point h) stored in the liquid air storage tank 900 isothermally increases its pressure up to the point j (approximately 200 atmospheres) in the pressurizing process of the liquid air pump 903. Then, in the heating process of the low temperature heat exchanging facility 800, the liquid air nearly isobarically increases its temperature and vaporizes along the line from the point j to the point k. after that, in the expansion process of the expansion turbine electric power generating facility 700, the vaporized air isentropically reduces its temperature and its pressure along the line from the point k to the point c. After that, in the heating process of the intermediate temperature heat exchanging facility 300 and the high temperature heat exchanging facility, the air having pressure of 10 atmospheres isobarically increases its temperature along the line from the point c to the point b. Then, the air is supplied to the combustor 106 in the state of the point b.

In FIG. 2, in both cases of temperature decrease from the point b and pressure decrease from the point k, the terminal temperature of the air is the point c. However, in order to obtain a lower temperature cold heat, for example, in order to use the cold heat for the liquefaction process, it is preferable that a terminal temperature in the case of pressure decrease from the point k is controlled so as to be lower than a terminal temperature in the case of temperature decrease from the point b. Thereby, by recovering the cold heat of low temperature, the cold heat can be used for the heat medium to cool air from the point d to the point e.

The present embodiment has three stages of the constructions composed of a heat exchanger of counter-flow type and a storage tank of heat medium, that is, the high temperature heat exchanging facility 400, the intermediate temperature heat exchanging facility 500 and the low temperature heat exchanging facility 800. However, the number of the stages and the kind of the heat medium may be selected in balancing the economic and the energy storage efficiency. By selecting an appropriate heat medium, 100% cold heat of the liquid air in the vaporizing process can be recovered and effectively used for cooling of the air in the liquefaction process.

In order to improve heat transfer coefficient, it is preferable that all the heat mediums in the present embodiment are liquid over the temperature range from the low temperature heat medium tank to the high temperature heat medium tank. For example, a machine oil is suitable for the first heat medium, and propane, a component of LNG, is suitable for the second heat medium and the third heat medium. Propane has a melting point of −188° C. and boiling point of −42° C., and therefore it is in liquid state over a wide range of approximately 150° C. Further, in addition to that propane can be used as a heat medium, propane can be vaporized and supplied to the combustor 106 as a fuel if it becomes unnecessary. As the other kinds of heat mediums, there may be used halogen compounds containing freon or a combination of alcohols. However, freon has a problem in disposal when it becomes unnecessary. Further, the tanks storing the heat medium (the low temperature heat medium tank 402, the high temperature heat medium tank 406, the low temperature heat medium tank 502, the high temperature heat medium tank 506, the low temperature heat medium tank 802, the high temperature heat medium tank 806) are constructed in a multiple structure for suppressing heat flow from the external, but some amount of heat will flow into them. Therefore, it is preferable that the heat medium in each of the heat medium tank is cooled to suppress evaporation by passing very low temperature (for example, approximately −170_) LNG through the inside of the heat medium tank when the LNG is supplied to the combustor 106 and performing heat exchange between the very low temperature LNG and the heat medium.

Energy storage efficiency of the energy storage gas turbine system of the present embodiment can be calculated.

In a conventional combined cycle electric power generating system having electric power output of a gas turbine of 150 MW per one shaft, power of the compressor is 150 MW and electric power output of the steam turbine is 80 MW. Therefore, the total electric power output is 230 MW. On the other hand, it is assumed that during peak period of electric power demand in the summer, the combined cycle electric power generating system is operated without intake air from the compressor and using 100% of liquid air, and the expansion turbine is operated using the liquid air in the evaporation process. Since the power of the compressor is not necessary and the amount is added to the electric power output of the gas turbine, electric power output of the gas turbine per one shaft of the present embodiment is 300 MW, electric power output of the expansion turbine is 60 MW, and electric power output of the steam turbine is 80 MW. Therefore, the total electric power output is 440 MW. According to the energy storage gas turbine system of the present embodiment, the electric power output is nearly twice as much as the electric power output of the conventional general combined cycle electric power generating plant which does not use liquid air. For example, in a case of a 6-shaft gas turbine electric power generating facility, the electric power output is increased from 1380 MW (conventional) to 2640 MW (this embodiment), and it is expected that the amount of the electric power is increased by 1260 MW.

In this embodiment, the power necessary for the liquefaction process is only the power for the compressor 102 (150 MW) and the power for the compressor 602 (35 MW), and the total power is 185 MW. Since the liquefaction ratio is 80%, the power required for the liquefaction process corresponding to the liquefaction ratio of 100% is 230 MW. On the other hand, the power (electric power output) capable of being recovered in the vaporizing process is that of the sum of the increased amount of power by not driving the compressor 102 (150 MW) and the power of the expansion turbine (60 MW) is subtracted with the power of the liquid air pump 903 (10 MW), and therefore the total power is 200 MW. Therefore, the energy storage efficiency becomes approximately 85%.

Since the electric power output of the gas turbine becomes twice when the present embodiment is applied, it is necessary to increase the capacity of the motor generator twice to that of the conventional gas turbine electric power generating facility. In order to cope with this problem, a motor generator having the twice capacity may be employed or two motor generators may be employed.

According to the present embodiment, there is an effect in that not only the required power necessary for the compressors can be reduced, but the electric power generated by the expansion turbine can be increased. Further, since the power is recovered by expanding the air and the cold heat is recovered by reducing temperature of the air, the energy storage efficiency is further increased. Furthermore, since several stages of the heat medium processes are employed in the liquefaction process, the cold heat can be efficiently stored.

As another embodiment, the compressor 602 and the expansion turbine 701 may be coupled by a turbine shaft.

Figure 3:
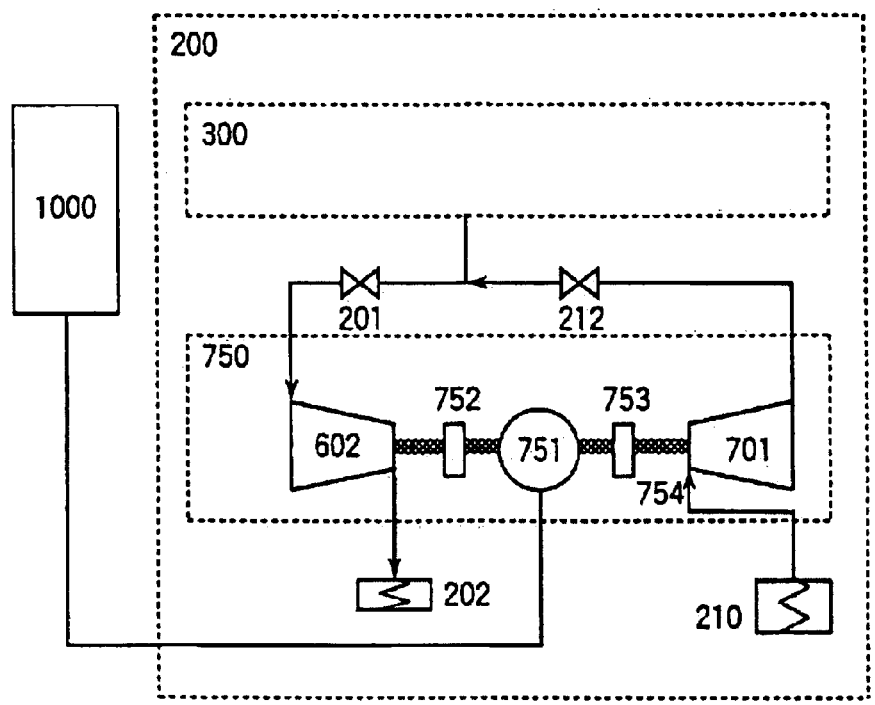
FIG. 3 is a diagram showing the mechanical systems of an embodiment of liquefaction/vaporizing facilities of an energy storage gas-turbine electric power generating system in accordance with the present invention.

FIG. 3 is a diagram showing the mechanical systems of an embodiment of liquefaction/vaporizing facilities of an energy storage gas-turbine electric power generating system in accordance with the present invention. In FIG. 3, the reference character 750 indicates a compression and electric power generating facility for compressing air and generating electric power by expanding air, the reference character 751 indicates a motor generator for converting mechanical energy to electric energy, the reference character 752 indicates a clutch for mechanically coupling and decoupling a turbine shaft 754, the reference character 753 indicates a clutch for mechanically coupling and decoupling the turbine shaft 754.

The motor generator 751 has a motor function and a generator function. In the compression and electric power generating facility 750, the compressor 602, the clutch 752, the motor generator 751, the clutch 753 and the expansion turbine 701 are mechanically coupled by the turbine shaft 754. The motor generator 751 is placed between the compressor 602 and the expansion turbine 701. The clutch 752 is placed between the compressor 602 and the motor generator 751, and couples and decouples the compressor 602 and the motor generator 751. The clutch 753 is placed between the expansion turbine 701 and the motor generator 751, and couples and decouples the expansion turbine 701 and the motor generator 751.

In (2) the energy charging mode operation, the clutch 752 is brought in an engaged state to couple the compressor 602 and the motor generator 751, and the clutch 753 is brought in a disengaged state to decouple the expansion turbine 701 and the motor generator 751. Then, the motor generator 751 is driven to drive the compressor 602 using electric power supplied from the surplus electric power supply unit 1000. In the compressor 602, the air cooled by the high temperature heat exchanging facility 300 is compressed.

On the other hand, in (3) the energy discharging electric power generating mode operation, the clutch 752 is brought in a disengaged state to decouple the compressor 602 and the motor generator 751, and the clutch 753 is brought in an engaged state to couple the expansion turbine 701 and the motor generator 751. The expansion turbine 701 is driven using the air heated by the air heater 210, and drives the motor generator 751 to generate electric power.

[Second Embodiment]

A second embodiment of an energy storage gas turbine system in accordance with the present invention will be described below.

This embodiment is characterized by that the heat medium is solid. That is, the heat medium tanks in the first embodiment in accordance with the present invention are replaced by cold heat regenerators. Further, the present embodiment is characterized by that the liquid air storage tank is installed inside the cold heat regenerator.

Figure 5:
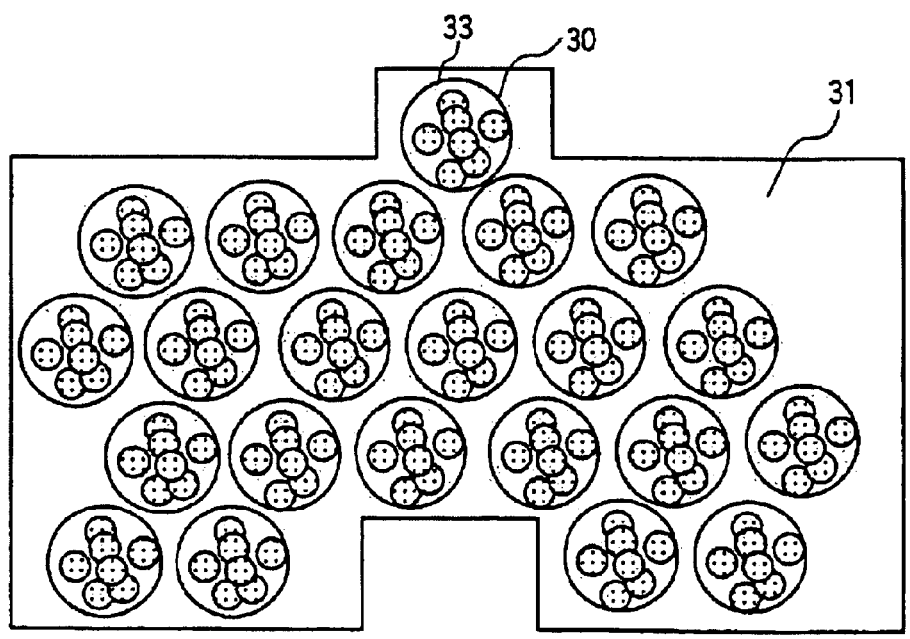
FIG. 5 is a view showing the construction of an embodiment of a cold energy regenerator of an energy storage gas-turbine electric power generating system in accordance with the present invention.
Figure 4A:
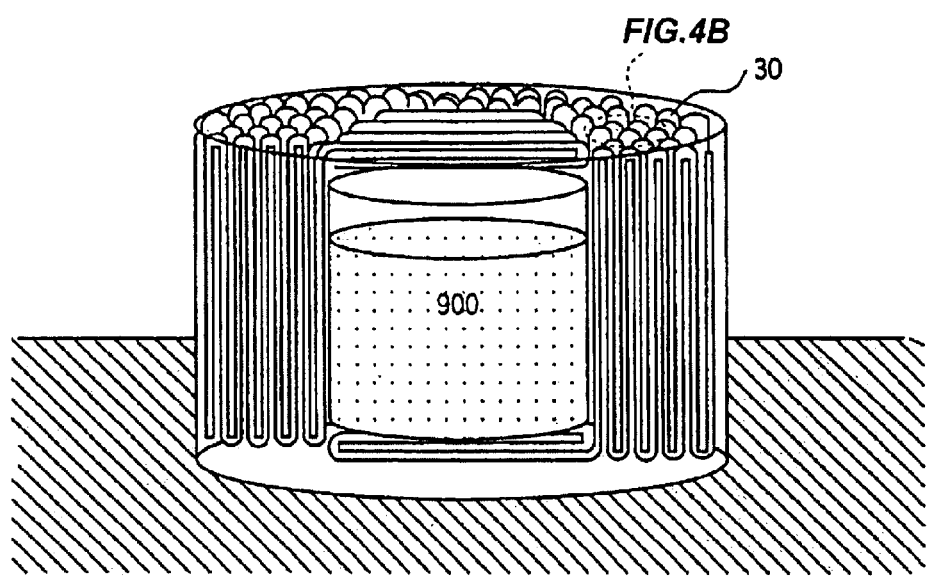
FIG. 4A is a view showing the construction of an embodiment of a cold energy regenerator of an energy storage gas-turbine electric power generating system in accordance with the present invention.
Figure 4B:
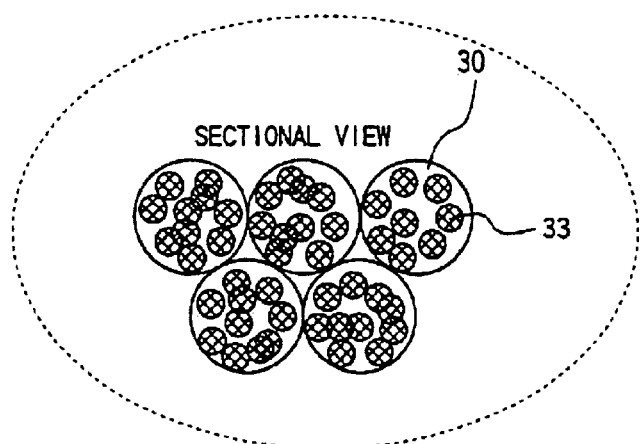
FIG. 4B is an enlarged top view of a portion of FIG. 4A.

FIGS. 4A, 4B and FIG. 5 show the construction of an embodiment of a cold heat regenerator of an energy storage gas-turbine electric power generating system in accordance with the present invention. In FIGS. 4A and 4B, the reference character 30 indicates a steel pipe, the reference character 31 indicates a header, and the reference character 33 indicates a solid heat medium.

The mechanical system of the present embodiment is the same as in the first embodiment except that the high temperature heat exchanging facility 300 and the low temperature heat exchanging facility 800 are replaced by the cold heat regenerators.

The cold heat regenerator is cylindrical. The cold heat regenerator has a structure in which a part or the whole of the cold heat regenerator is buried in the ground.

The inside of the cold heat regenerator is composed of a cluster of the steel pipes 30. Diameter of the steel pipe is, for example, about 200 mm. Material of the steel pipe 30 used is, for example, a stainless steel having corrosion-resistance and anti-abrasion, an economical carbon steel, etc. Or, copper pipes having better thermal conductivity may be also used instead of the steel pipes. As shown in the cross-sectional view of FIG. 4, the inside of the steel pipe is filled with the spherical solid heat mediums 33 having a diameter about 30 mm. The solid medium 33 is made of, for example, stone, ceramic, or metal oxide such as iron oxide. The cluster of the steel pipes 30 are arranged in a triangular grid so as to be in contact with one another, and the whole cold heat regenerator is formed in a unit. The gap in the cluster of the steel pipes 30 is filled with sand or the like. By doing so, heat transfer between the steel pipes is decreased, and the cluster of the steel pipes 30 are constructed so as to support one another. Although the steel pipe is expanded by inner pressure caused by passing the air compressed by the compressor 102 through the inside of the steel pipe 30, the strength withstanding inner pressure is largely increased by supporting the steel pipe from outside. Part of the steel pipes 30 arranged adjacent to each other in the tangential direction may be formed together in a complete one piece structure by welding or the like. It is not preferable that the steel pipes 30 arranged adjacent to each other in the radial direction are formed in a one piece structure as described above. This is because since there is a temperature difference between the steel pipes arranged in the radial direction (temperature of the steel pipes 30 arranged in the outer periphery side is high, and temperature of the steel pipes 30 arranged in the inner periphery side is low), and elongation of the steel pipe is different depending on the arranged position in the radial direction. Therefore, if the steel pipes 30 arranged adjacent to each other in the radial direction are formed in a one piece structure, the steel pipes may be deformed. This should be avoided.

The liquid air storage tank 900 is arranged inside the cold heat regenerator. By doing so, heat flow from the external into the liquid air storage tank 900 can be substantially suppressed, and the structure of the liquid air storage tank 900 can be simplified because the liquid air storage tank 900 is supported by the cold heat regenerator. Further, it is preferable that the steel pipes 30 arranged near the side wall of the liquid air storage tank 900 are formed in the vertical direction. It is also preferable that the steel pipes 30 arranged near the top wall and/or near the bottom wall of the liquid air storage tank 900 are formed in the horizontal direction. By doing so, heat transmission of the steel pipes 30 can be suppressed not only in the radial direction but also in the vertical direction.

The steel pipe 30 arranged in the outer peripheral side in the radial direction of the cold heat regenerator (namely, circle-columnar steel pipe 30) is connected to the gas turbine electric power generating facility 100. On the other hand, the steel pipe 30 arranged in the inner peripheral side in the radial direction is connected to the liquid air storage tank 900. The air compressed by the compressor 102 is supplied into the steel pipe 30 through a steel pipe port provided in the outer peripheral side, and is directly in contact with the heat mediums 33 to exchange heat and be cooled while the air flows inside the steel pipe 30 toward the inner peripheral side, and then is supplied to the liquid air storage tank 900 through a steel pipe port provided in the inner peripheral side. That is, the cluster of steel pipes 30 arranged in the outer peripheral side in the radial direction of the cold heat regenerator corresponds to the high temperature heat exchanging facility 300 in the first embodiment, and the cluster of steel pipes 30 arranged in the inner peripheral side in the radial direction of the cold heat regenerator corresponds to the low temperature heat exchanging facility 800 in the first embodiment. Temperature of the cluster of the steel pipes 30 becomes higher as the position goes toward the outer side, and temperature of the cluster of the steel pipes 30 becomes lower as the position goes toward the inner side. By doing so, heat transmission between the steel pipes 30 can be suppressed.

As another embodiment of the cold heat regenerator, the cold heat regenerator itself may be formed of a heat medium.

That is, the cylindrical cold heat regenerator is formed using a sold heat medium (for example, concrete). Flow passages having a diameter of approximately 100 mm are directly formed in the concrete block. Therein, a flow passage for the liquefaction process and a flow passage for vaporizing process are independently formed. By doing so, the (2) energy charging mode operation and the (3) energy discharging electric power generating mode operation can be performed by the liquefaction/vaporizing facility 200.

Further, as shown in FIG. 5, a block having a thickness of about 1 m is formed by bonding steel pipes 30 having a thin wall thickness and a header 31 together with concrete. The blocks are formed so as to easily engaged each other. The cold heat regenerator may be constructed by engaging the blocks with one another. Only steel pipes 30 for connecting among the blocks are connected in the upper portion of the blocks. Since pressure of the air compressed by the compressor 102 is supported by the concrete block, the wall thickness of the steel pipe 30 can be made thin. When the liquid air is vaporized inside the liquid air storage tank 900 and the pressure in the liquid air storage tank 900 is increased, the vaporized air is passed through the safety valve 905 and through the cold heat regenerator to recover the cold heat of the vaporized air to the heat medium 33, and then ejected to the external. Although the shape of the liquid air storage tank 900 is basically cylindrical, vertical columns may be provided inside the liquid air storage tank 900 to support the top portion of the liquid air storage tank 900. Pressure loss of the air flowing through the inside of the steel pipe 30 increases proportional to square of the flow speed and linearly proportional to the length of the steel pipe 30. Therefore, it is preferable that the steel pipes 30 are connected at the upper position to the header 31, and accordingly the compressed air flows through the insides of a plurality of steel pipes 30 in parallel to reduce the flow speed. Further, in the liquefaction process, the temperature distribution in the cold heat regenerator is changed so that the high temperature portion is moved toward the outer peripheral direction as time passes. On the contrary, in the vaporizing process, the temperature distribution in the cold heat regenerator is changed so that the low temperature portion is moved toward the outer peripheral direction as time passes. Therefore, by measuring the temperature distribution of the cold heat regenerator in the radial direction, the air flow path is changed by switching the valves provided between the headers 31 based on the measured result of a zone where temperature of the air in vaporizing process is increased up to the outlet temperature (for example, 320° C. to 350° C.) of the compressor 102, or the measured result of a zone where temperature of the air in liquefaction process is decreased near the liquid air temperature (for example, approximately −190° C.). By doing so, the length of the steel pipe 30 in which the air flows is appropriately adjusted to reduce the pressure loss. When the low temperature gas-phase air from the gas-liquid separator 207 is passed through the cold heat regenerator, the flow path of the gas-phase air is changed by switching the valves to appropriately cool a portion of the steel pipes where the temperature becomes high.

Figure 6:
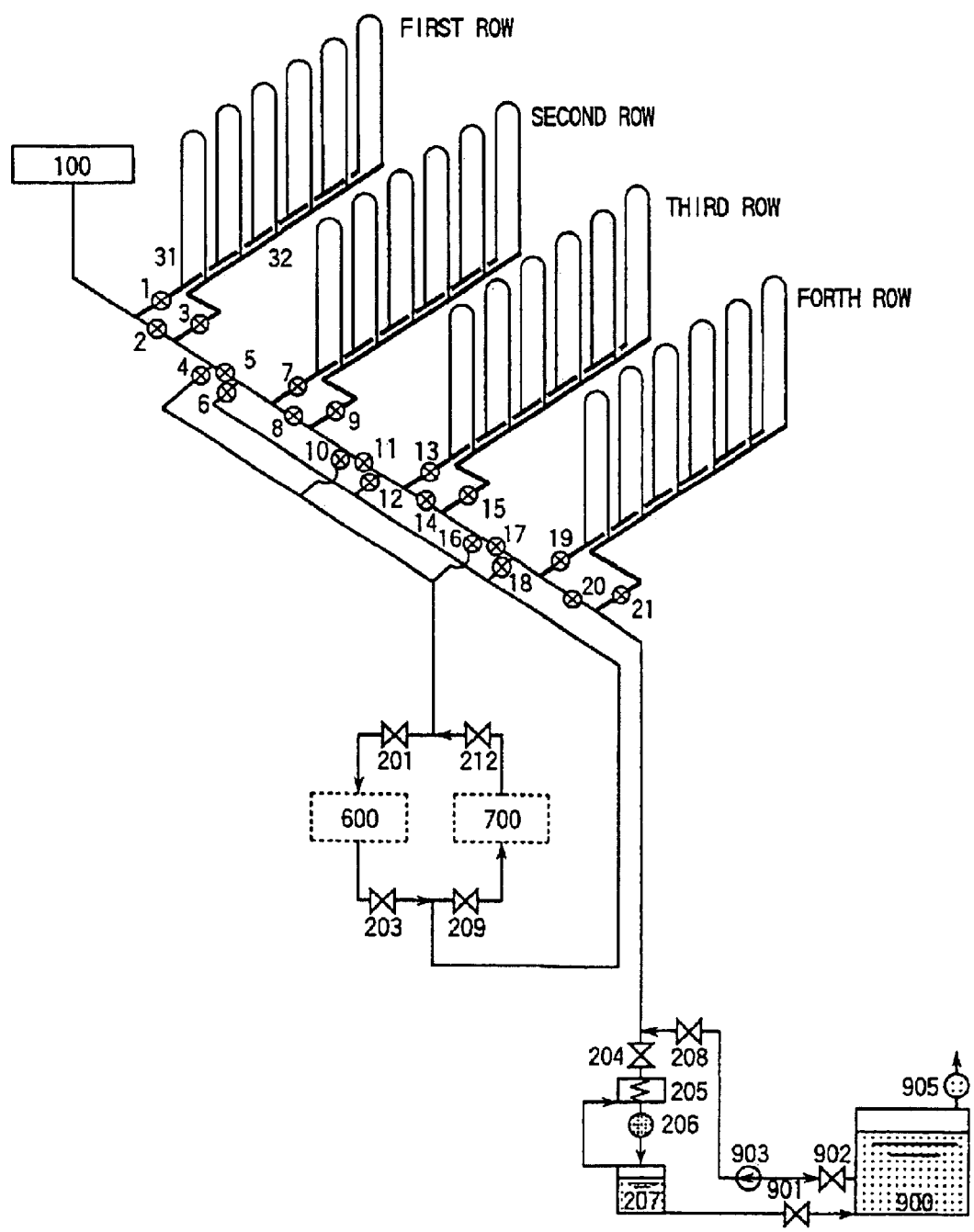
FIG. 6 is a view showing an embodiment of a piping system of a cold energy regenerator of an energy storage gas-turbine electric power generating system in accordance with the present invention.

FIG. 6 shows a piping system of a cold heat regenerator of an energy storage gas-turbine electric power generating system in accordance with the present invention. In FIG. 6, the reference characters 1 to 21 indicate valves for shut off air, and the reference character 32 indicates a header.

Two steel pipes having a height of nearly 20 m filled with a heat medium are welded to form in a U-shape. The bottom portions of the U-shaped steel pipe are welded to the header 31 and header 32. The number of the U-shaped pipes welded to the headers is arbitrarily determined depending on a capacity of the cold heat regenerator. The first row of the steel pipe group is arranged in the outer peripheral side of the cold heat regenerator. The other rows are arranged in the inner side of the cold heat regenerator in the order of the second row, the third row, the fourth row.

Operation of each of the valves in the (2) energy charging mode operation will be described below. When the liquefaction process operation is started, the valve 1, the valve 3, the valve 5, the valve 7, the valve 9, the valve 10, the valve 12, the valve 13, the valve 15, the valve 17 and the valve 20 are opened, and the other valves are closed. The air compressed by the compressor 102 is supplied to the first row of the steel pipe group through the valve 1 to be cooled in the first row of the steel pipe group. The air cooled by the first row of the steel pipe group is supplied to the second row of the steel pipe group through the valve 3, the valve 5 and the valve 7 to be cooled up to a temperature corresponding to the liquid temperature in the second row of the steel pipe group. The air cooled by the second row of the steel pipe group is supplied to the compressing facility 600 through the valve 10 to be compressed by the compressing facility 600. In the compression process, temperature of the air is increased. The air of which temperature is increased by being compressed by the compression facility 600 is supplied to the third row of the steel pipe group through the valve 12 and the valve 13 to be cooled up to a temperature corresponding to the liquid temperature in the third row of the steel pipe group again. The air cooled by the third row of the steel pipe group is supplied to the expansion valve 206 through the valve 17 and the valve 20. That is, the first row of the steel pipe group corresponds to the high temperature heat exchanging facility 400 in FIG. 1, the second row of the steel pipe group corresponds to the intermediate temperature heat exchanging facility 500 in FIG. 1, and the third row of the steel pipe group corresponds to the low temperature heat exchanging facility 800 in FIG. 1.

When the temperature of the heat mediums contained in the steel pipes in the first row to the third row is increased as time passes, the valve 1, the valve 3, the valve 10 and the valve 17 are closed and the valve 2, the valve 11, the valve 16, the valve 19 and the valve 20 are opened. That is, the second row of the steel pipe group corresponds to the high temperature heat exchanging facility 400 in FIG. 1, the third row of the steel pipe group corresponds to the intermediate temperature heat exchanging facility 500 in FIG. 1, and the fourth row of the steel pipe group corresponds to the low temperature heat exchanging facility 800 in FIG. 1.

The energy storage efficiency of the present embodiment can be evaluated by the following equation.

$$Eff = \{Liq \times (Pc - Pp - Qh)\}/(Pc + Qc) \qquad \text{(Equation 1)}$$

Therein, Eff is energy storage efficiency (−); Liq is liquefaction ratio expressing a ratio of an amount of air compressed by the compressor converted to liquid air to the air compressed by the compressor (−); Pc is power of the compressor (J/kg); Pp is power of the pump to pressurize the liquid air (J/kg); Qh is heat loss which is caused by that the temperature of the air vaporized in the cold heat regenerator (the liquefaction/vaporizing facility) is lower than the temperature of the air at the outlet of the compressor (J/kg); and Qc is power required for recovering a shortage of cold heat in the cold heat regenerator (J/kg).

The liquefaction ratio Liq is determined by difference between an outlet temperature in the low temperature side of the cold heat regenerator and a temperature of the liquid air.

Figure 7:
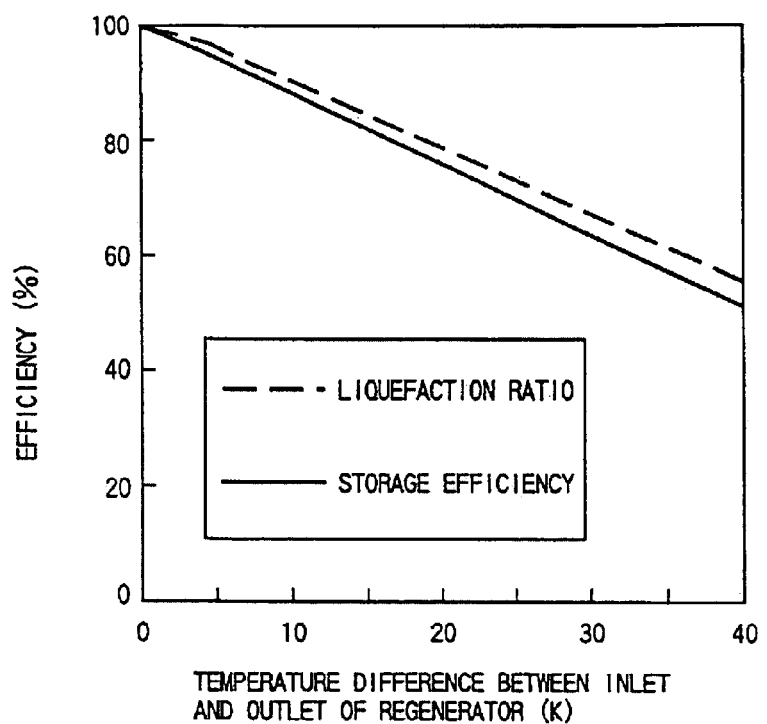
FIG. 7 is a graph showing liquefaction ratio and storage efficiency of an energy storage gas-turbine electric power generating system in accordance with the present invention.

The heat loss Qh and the power Qc are calculated from difference between inlet temperature and outlet temperature of air in the high temperature side of the cold heat regenerator. FIG. 7 shows calculated results of liquefaction ratio and energy storage efficiency under assumption that the outlet pressure of the compressor is 4.0 MPa which is higher than the critical pressure of air of 3.77 MPa and the pressure loss in the cold heat regenerator is 0.1 MPa. The abscissa of FIG. 7 is the difference between temperature of the heat medium in the inlet and the heat medium in the outlet of the cold heat regenerator, and the evaluation is performed assuming that a temperature difference between the outlet and inlet of the high temperature side of the cold heat regenerator (namely, a difference between the temperature of air compressed by the compressor) is equal to a temperature difference between the outlet and inlet of the low temperature side of the cold heat regenerator (namely, a difference between a temperature of air cooled by the cold heat regenerator and a temperature of liquid air stored in the liquid air storage tank). In a case where heat exchange is performed between the solid heat medium and the fluid in direct contact, the temperature difference between the surface of the heat medium and the fluid can be made small. Although the temperature difference between the surface and the inside of the heat medium becomes a problem when interval of heat exchange is short, the thermal resistance inside the heat medium can be negligible in this case where heat exchange in the same flow direction is continued for several hours. Since heat exchange is performed twice, cooling and heating, in the cold heat regenerator, twice of the temperature difference between the fluid and the heat medium in each heat exchange corresponds to the temperature difference of the abscissa of FIG. 7.

When the temperature difference between the fluid and the heat medium is 5 K, that is, the temperature difference of the abscissa of FIG. 7 is 5 K, the energy storage efficiency is 87%. When the temperature difference between the fluid and the heat medium is 10 K, the energy storage efficiency is 76%. On the other hand, since a pump-up hydraulic electric power station is constructed at a site far from a place demanding electric power, there is an electric power transmission loss. Accordingly, the energy storage efficiency is as low as 70%. Therefore, the energy storage gas turbine electric power generating system of the present embodiment can attain an energy storage efficiency higher than that of the pump-up hydraulic electric power station if the electric power transmission loss is negligible by installing the gas turbine system in an existing power generating station or somewhere.

According to the present embodiment, since the cold heat regenerator is arranged around the liquid air storage tank, there is an effect in that heat flow into the liquid air storage tank from the external can be substantially reduced. According to the present embodiment, since compared to the first embodiment the heat medium tanks are not necessary and the cold heat regenerator and the liquid air storage tank are integrated in a unit, there is an effect that the liquefaction/vaporizing facility is simplified and the installation area of the liquefaction/vaporizing facility can be reduced.

[Third Embodiment]

A third embodiment of an energy storage gas turbine electric power generating system will be described below.

In general, when a gas having the same weight is compressed, power required to compress the gas becomes small as the temperature of the gas supplied to the compressor (the inlet side of the compressor) is lower and as the volume of the gas is smaller. That is, when air is compressed using a compressor having one stage, temperature of the air is increased in the compression process. Therefore, when the air in the middle of the compression process in the compressor is once cooled and then further compressed, the power of the compressor can be reduced compared to the case without the cooling. The present embodiment is characterized by that the compressor is constructed in multistage (for example, three-stage) and the air in the middle of compression process is cooled.

Figure 8:
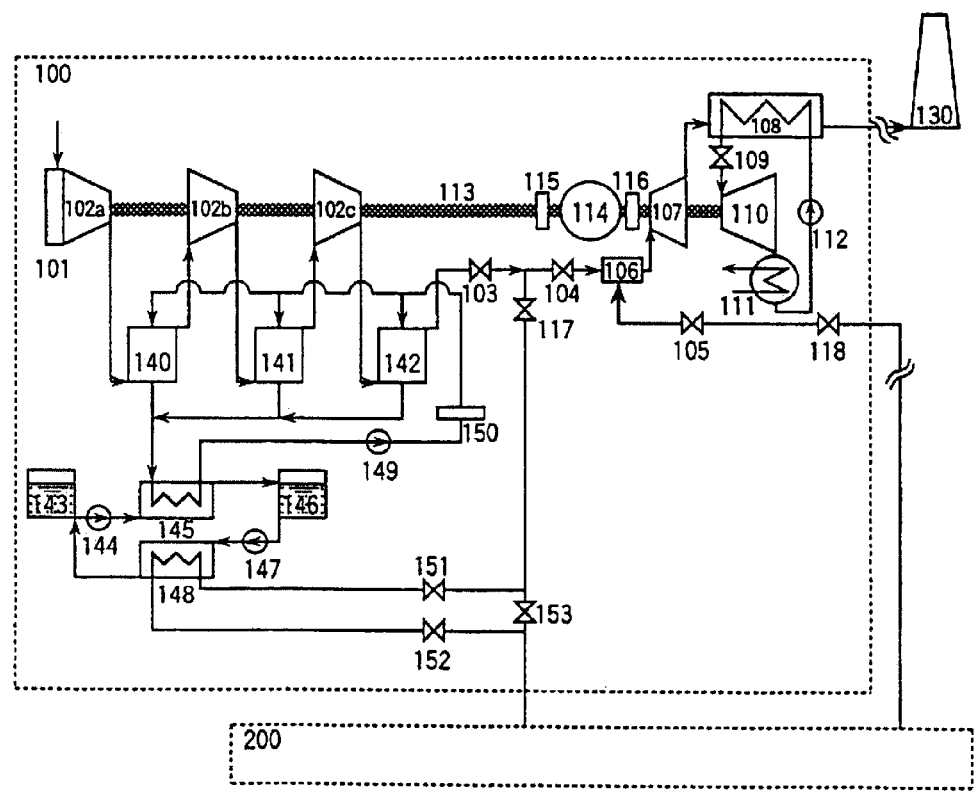
FIG. 8 is a diagram showing an embodiment of a mechanical system of a gas turbine electric generating facility of an energy storage gas-turbine electric power generating system in accordance with the present invention.

FIG. 8 is a diagram showing an embodiment of a mechanical system of a gas turbine electric generating facility of an energy storage gas-turbine electric power generating system in accordance with the present invention. In FIG. 8, the reference characters 102a to 102c indicate compressors for compressing air, the reference characters 140 to 142 indicate cooling towers for cooling the air compressed by the compressors, the reference character 143 indicates a low temperature heat medium tank for storing a fourth heat medium of low temperature, the reference character 144 indicates a heat medium pump for pressurizing the fourth heat medium of low temperature stored in the low temperature heat medium tank 143, the reference character 145 indicates a first heat exchanger for cooling a coolant (water) returned from the cooling towers 140 to 142, the reference character 146 indicates a high temperature heat medium tank for storing the fourth heat medium of high temperature, the reference character 147 indicates a heat medium pump for pressurizing the fourth heat medium of high temperature stored in the high temperature heat medium tank 146, the reference character 148 indicates a second heat exchanger for heating the air evaporated by the liquefaction/vaporizing facility 200, the reference character 149 indicates a coolant pump for pressurizing the coolant cooled by the first heat exchanger 145, the reference character 150 indicates a filter for removing dust and the like in the coolant compressed by the coolant pump 149, and the reference characters 151 to 153 indicate air shut-off valves for shutting off air. The other construction not indicated above has the same functions as those of the first embodiment of the present invention or the second embodiment of the present invention.

The compressors 102a to 102c in this embodiment are those which can be obtained by dividing the compressor 102 in the first embodiment of the present invention described above into three stages. Further, the cooling towers 140 to 142 inject the compressed air through the bottom portion into the interior and eject the injected air through the top portion to the outside. The cooling towers 140 to 142 are sprayed with small drops of a coolant (water) through the top and eject the coolant (water) through the bottom. That is, the air injected into the bottom portion of the cooling towers 140 to 142 is directly in contact with the coolant sprayed from the top portion of the cooling tower, and thereby the air is cooled and at the same time dust and the like contained in the air are removed.

The air compressed by the compressor 102a is supplied to the cooling tower 140, and the air is cooled and dust-removed in the cooling tower 140. The air cooled in the cooling tower 140 is supplied to the compressor 102b, and compressed in the compressor 102b. The air compressed by the compressor 102b is supplied to the cooling tower 141, and the air is cooled and dust-removed in the cooling tower 141. The air cooled in the cooling tower 141 is supplied to the compressor 102c, and compressed in the compressor 102c. The air compressed by the compressor 102c is supplied to the cooling tower 142, and the air is cooled and dust-removed in the cooling tower 142. The air cooled in the cooling tower 142 is supplied to the combustor 106 through the air shut-off valve 103 and through the shut-off valve 104. At the same time, the air cooled in the cooling tower 142 is supplied to the liquefaction/vaporizing facility 200 through the air shut-off valve 103, the shut-off valve 117 and the shut-off valve 151.

On the other hand, the coolant heated by the cooling tower 140, the coolant heated by the cooling tower 141 and the coolant heated by the cooling tower 142 are supplied to the first heat exchanger 145 of counter-flow type. On the other hand, a fourth heat medium (for example, machine oil or the like) of low temperature is stored in the low temperature heat medium tank 143. The fourth heat medium stored in the low temperature heat medium tank 143 is supplied to the first heat exchanger 145 by a heat medium pump 144. In the first heat exchanger, the coolant heated by the cooling towers 140 to 142 is cooled by performing heat exchange between the coolant heated by the cooling towers 140 to 142 and the fourth heat medium of low temperature pressurized by the heat medium pump 144. The fourth medium heated to high temperature by the first heat exchanger 145 is supplied to the high temperature heat medium tank 146 to be stored in the high temperature heat medium tank 146. On the other hand, the coolant cooled by the first heat exchanger 145 is pressurized by a coolant pump 149, and dust-removed by a filter 150, and then supplied to the cooling towers 140 to 142 again.

The fourth heat medium of high temperature stored in the high temperature heat medium tank 146 is pressurized by the heat medium pump 147 to be supplied to the second heat exchanger 148 of counter-flow type. On the other hand, the air vaporized by the liquefaction/vaporizing facility 200 is supplied to the second heat exchanger 148 through the air shut-off valve 152. In the second heat exchanger 148, the air vaporized by the liquefaction/vaporizing facility 200 is heated by performing heat exchange between the air vaporized by the liquefaction/vaporizing facility 200 and the fourth heat medium of high temperature pressurized by the heat medium pump 147. The fourth heat medium cooled to low temperature by the second heat exchanger 148 is supplied to the low temperature heat medium tank 143 to be stored in the low temperature heat medium tank 143. On the other hand, the air heated by the second heat exchanger 148 is supplied to the combustor 106 through the air shut-off valve 117.

According to the present embodiment, since the air in the compression process using the compressor is once cooled, that is, the air is compressed while being cooled, there is an effect in that the power of the compressor can be reduced. Further, the same effect as above can be attained even if there is not the cooling tower 142.

Figure 9:
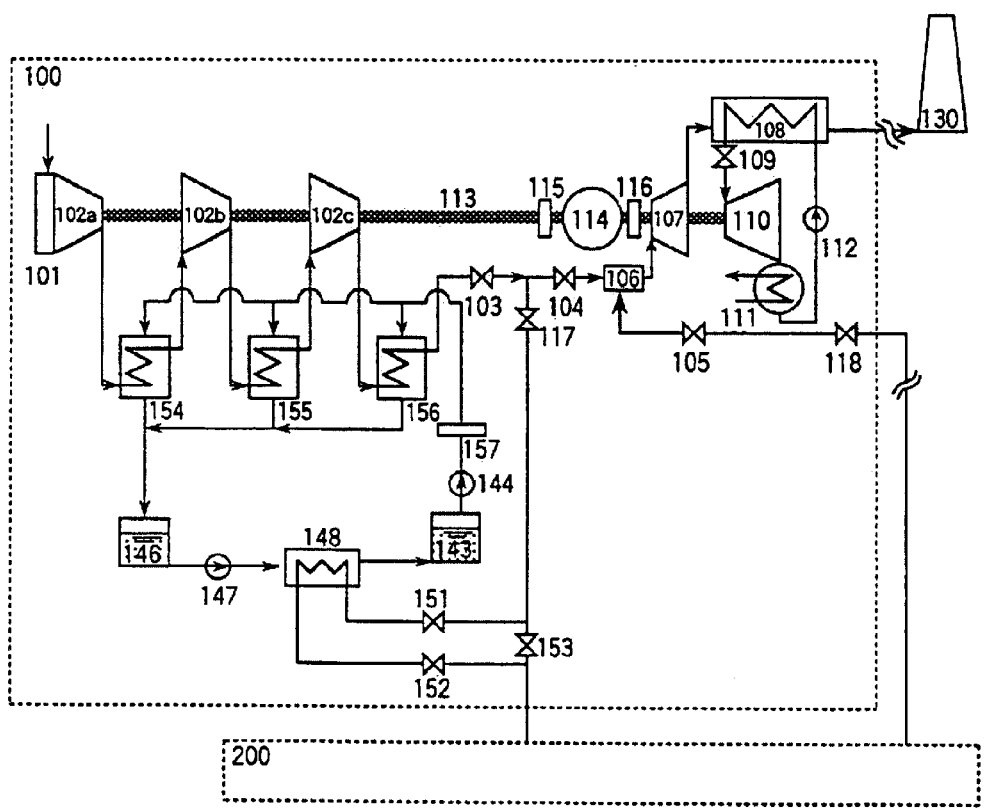
FIG. 9 is a diagram showing an embodiment of a mechanical system of a gas turbine electric generating facility of an energy storage gas-turbine electric power generating system in accordance with the present invention.

As for another embodiment, a cooling tower of an indirect contact type may be employed instead of the cooling tower of a direct contact type. FIG. 9 is a diagram showing an embodiment of a mechanical system of a gas turbine electric generating facility of an energy storage gas-turbine electric power generating system in accordance with the present invention. In FIG. 9, the reference characters 154 to 156 indicate cooling towers of an indirect type using heat transfer tubes, and the reference character 157 indicates a filter for removing dust and the like in the fourth heat medium pressurized by the heat medium pump 144.

The fourth heat medium of low temperature stored in the low temperature heat medium tank 143 is pressurized by the heat medium pump 144, and dust-removed by the filter 157, and then supplied to the cooling towers 154 to 156. On the other hand, the air compressed by the compressors 102a to 102c is supplied to the heat transfer tubes of the cooling towers 154 to 156. In the cooling towers 154 to 156, the air compressed by the compressors 102a to 102c is cooled by performing indirect heat exchange between the compressors 102a to 102c and the forth heat medium through the heat transfer tubes. The fourth heat medium heated to high temperature by the cooling towers 154 to 156 is supplied to the high temperature heat medium tank 146 to be stored in the high temperature heat medium tank 146. The same effect can be also attained by the present embodiment.

Figure 10:
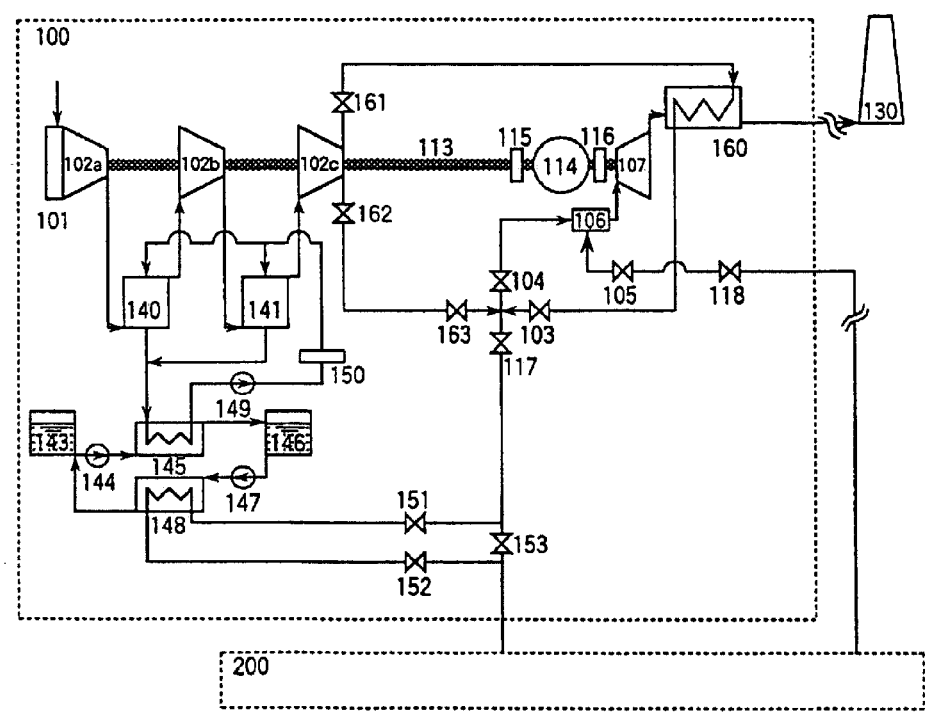
FIG. 10 is a diagram showing an embodiment of a mechanical system of a gas turbine electric generating facility of an energy storage gas-turbine electric power generating system in accordance with the present invention.

As for another embodiment, the air compressed by the compressor (the air supplied to the combustor 106) may be heated using the gas turbine exhaust gas as a heat source. When the air in the compression process using the compressor is cooled as shown in the embodiment according to the present invention described above, temperature of the air at the outlet of the compressor (the air compressed by the compressor), that is, the air supplied to the combustor 106 is decreased. Since the temperature of the air supplied to the combustor 106 is reduced and consequently temperature of the combusted gas is reduced, the electric power generating efficiency is also decreased. Therefore, the air compressed by the compressor is heated using the gas turbine exhaust gas as the heat source to increase the temperature of the air to be supplied to the combustor 106 and consequently to improve the electric power generating efficiency. FIG. 10 is a diagram showing an embodiment of a mechanical system of a gas turbine electric generating facility of an energy storage gas-turbine electric power generating system in accordance with the present invention. In FIG. 10, the reference character 160 indicates a regenerative heat exchanger for heating the air to be supplied to the combustor 106 using the gas turbine exhaust gas as the heat source. The reference characters 151–153 each indicate an air shut-off valve.

The regenerative heat exchanger 160 is installed in the downstream of the gas turbine 107 (between the gas turbine 107 and the stack 130). In (1) the normal electric power generating mode, the gas turbine exhaust gas is supplied to the regenerative heat exchanger 160. On the other hand, the air compressed by the compressor 102c is supplied to the regenerative heat exchanger 160 through the air shut-off valve 161. In the regenerative heat exchanger 160, the air compressed by the compressor 102c is heated by performing heat exchange between the gas turbine exhaust gas (for example, approximately 500° C.) and the air compressed by the compressor 102c (for example, approximately 80° C.). The air heated by the regenerative heat exchanger 160 is supplied to the combustor 106 through the air shut-off valves 103, 104. In (2) the energy charging mode, the air compressed by the compressor 102c is supplied to the liquefaction/vaporizing facility 200 through the air shut-off valves 152, 153 and 117. On the other hand, the gas turbine exhaust gas cooled by the regenerative heat exchanger 160 is supplied to the stack 130 to be ejected to the atmosphere through the stack 130.

The present embodiment can attain an electric power generating efficiency equivalent to that of a general combined cycle electric power generating plant even without any steam turbine system. However, the regenerative heat exchanger 160 is very simple compared to the steam turbine system. That is, according to the present embodiment, there is an effect in that compared to the general combined cycle electric power generating plant, the gas turbine electric power generating system 100 can be simplified, the reliability to prevention of failure in the gas turbine electric power generating system 100 can be improved, and the cost of the facility can be substantially reduced.

[Fourth Embodiment]

A fourth embodiment of an energy storage gas turbine electric power generating system will be described below.

In the first embodiment in accordance with the present invention, if the temperature of the air at the inlet of the expansion turbine 701 (the air supplied to the expansion turbine 701) is increased or the temperature of the air at the outlet of the expansion turbine 701 (the air exhausted from the expansion turbine 701) is decreased, an amount of the electric power of the expansion turbine can be increased. In the first embodiment in accordance with the present invention, since the pressure of the air at the outlet of the expansion turbine 701 is set to a pressure (for example, 10 to 15 atmospheres) necessary for supplying to the combustor 106, the temperature of the air at the inlet of the expansion turbine 701 is high. The heat of the air stored in the low temperature heat exchanging facility 800 during the liquefaction process is used for heating the air to be supplied to the expansion turbine electric power generating facility 700. In the low temperature heat exchanging facility 800, the heat of the air during the liquefaction process is recovered to the third heat medium in liquid state, and the third heat medium is stored in the high temperature heat medium tank 806. Therein, the temperature range capable of keeping the heat medium in liquid state is unexpectedly narrow. For example, the temperature range for water is 0° C. to 100° C., the temperature range for methanol is −98° C. to 64° C., and the temperature range for propane is −188° C. to −42° C. If propane is employed as the third heat medium, the third heat medium can recover cold heat below −42° C. in keeping liquid state, but cannot recover cold heat above −42° C. in keeping liquid state. Therefore, in order to recover high temperature cold heat above −42° C., cold heat must be discharged to the outside portion of the high temperature heat medium tank 806. Therefore, the present embodiment is characterized by that a multistage heat exchanging facility for recovering heat of the air compressed by the compressor 102 to the heat medium during the liquefaction process and heating the air to be supplied to the expansion turbine electric power generating facility 700 during the vaporizing process using the recovered heat is installed in a flow path where the liquid air stored in the liquid air storage tank 900 is supplied to the expansion turbine electric power generating facility 700 (between the liquid air storage tank 900 and the expansion turbine electric power generating facility 700), and temperature of the air supplied to the expansion turbine electric power generating facility 700 is increased using the multistage heat exchanging facility.

Figure 11:
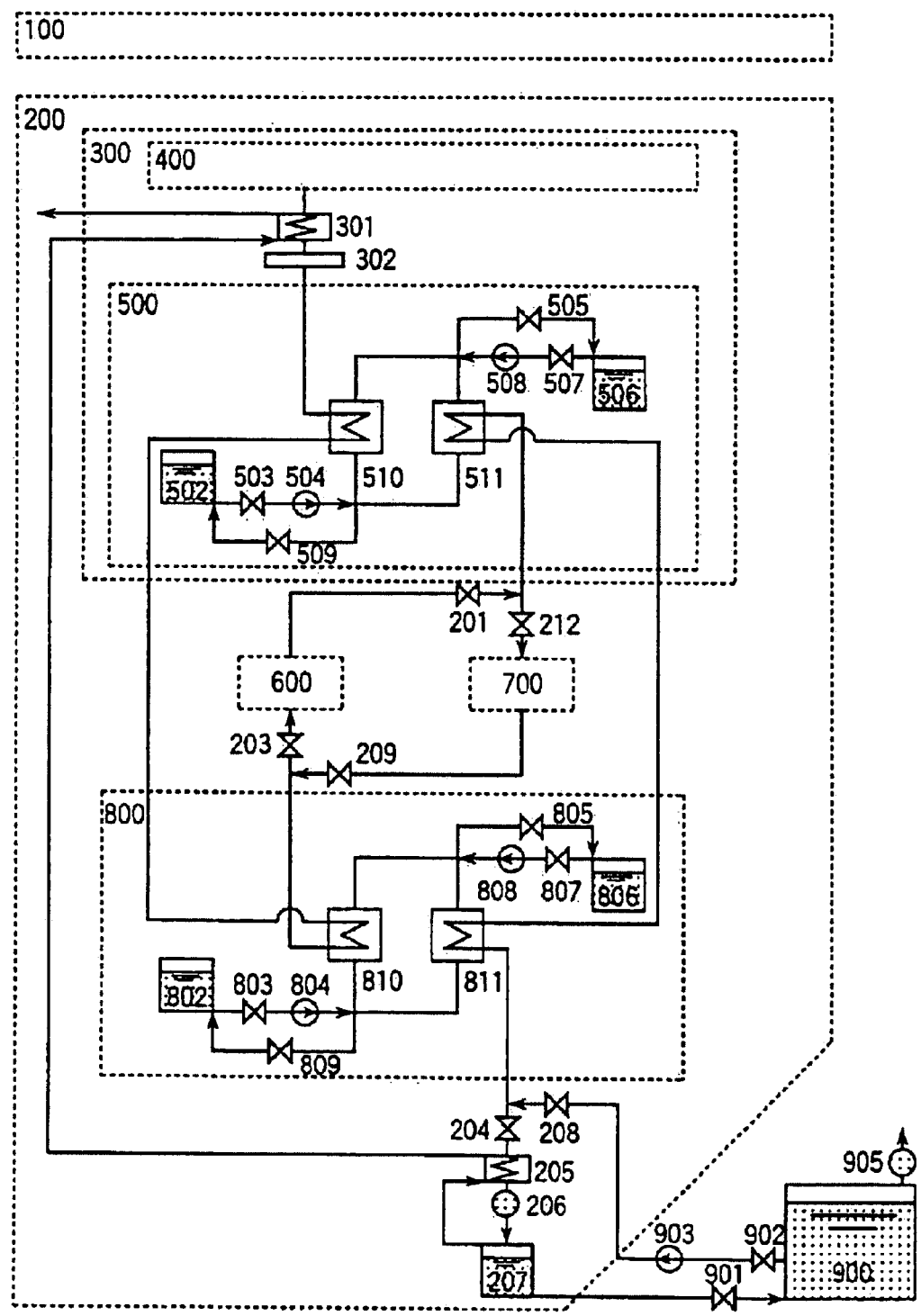
FIG. 11 is a diagram showing the mechanical systems of an embodiment of liquefaction/vaporizing facilities of an energy storage gas-turbine in accordance with the present invention.

FIG. 11 is a diagram showing the mechanical systems of an embodiment of liquefaction/vaporizing facilities of an energy storage gas-turbine in accordance with the present invention. In FIG. 11, the reference character 510 indicates a first intermediate temperature heat exchanger, the reference character 511 indicates a second intermediate temperature heat exchanger, the reference character 810 indicates a first low temperature heat exchanger and the reference character 811 indicates a second low temperature heat exchanger. The other construction not described above has the same function as that in the first embodiment of the present invention to the third embodiment of the present invention.

Firstly, operation of the liquefaction/vaporizing facility 200 and so on during the energy charging mode will be described below. The air from the filter 302 is cooled by performing heat exchange with the second heat medium of low temperature in the first intermediate temperature heat exchanger 510, and supplied to the first low temperature heat exchanger 810. The air cooled by the first intermediate temperature heat exchanger 510 is cooled by performing heat exchange with the third heat medium of low temperature in the first low temperature heat exchanger 810, and supplied to the compressing facility 600 through the air shut-off valve 203. The air cooled by the first low temperature heat exchanger 810 is compressed in the compressing facility 600, and supplied to the second intermediate heat exchanger 511 through the air shut-off valve 201. The air compressed by the compressing facility 600 is cooled by performing heat exchange with the second heat medium of low temperature in the second intermediate temperature heat exchanger 511, and supplied to the second low temperature heat exchanger 811. The air cooled by the second intermediate temperature heat exchanger 511 is cooled by performing heat exchange with the third heat medium of low temperature in the second low temperature heat exchanger 811, and supplied to the low temperature air cold heat recovery unit 205 through the air shut-off valve 204.

Next, operation of the liquefaction/vaporizing facility 200 and so on during the energy discharging electric power generating mode will be described below. The liquid air pressurized by the liquid air pump 903 is heated and vaporized by performing heat exchange with the third heat medium of high temperature in the second low temperature heat exchanger 811, and supplied to the second heat exchanger 511. The air heated and vaporized in the second low temperature heat exchanger 811 is heated by performing heat exchange with the second heat medium of high temperature in the second intermediate temperature heat exchanger 511, and supplied to the expansion turbine electric power generating facility 700 through the air shut-off valve 212. The air heated by the second intermediate temperature heat exchanger 511 is expanded in the expansion turbine electric power generating facility 700, and supplied to the first low temperature heat exchanger 810 through the air shut-off valve 209. The air expanded in the expansion turbine electric power generating facility 700 is heated by performing heat exchange with the third heat medium of high temperature in the first low temperature heat exchanger 810, and supplied to the first intermediate temperature heat exchanger 510. The air heated by the first low temperature heat exchanger 810 is heated by performing heat exchange with the second heat medium of high temperature in the first intermediate temperature heat exchanger 510, and supplied to the filter 302.

According to the present embodiment, since temperature of the air supplied to the expansion turbine electric power generating facility 700 can be increased compared to that in the first embodiment of the present invention described above, there is an effect in that the amount of electric power generation of the expansion turbine electric power generating facility 700 can be increased. That is, the heat is supplied to the air downstream of the expansion turbine electric power generating facility 700 (between the expansion turbine electric power generating facility 700 and the gas turbine electric power generating facility 100) during the vaporizing process in the above-mentioned first embodiment of the present invention. However, in the present embodiment, the heat is supplied to the air upstream of the expansion turbine electric power generating facility 700 (between the liquid air storage tank 900 and the expansion turbine electric power generating facility 700) during the vaporizing process, that is, the air supplied to the expansion turbine electric power generating facility 700. Therefore, temperature of the air supplied to the expansion turbine electric power generating facility 700 is increased.

Further, in the present embodiment, since the air compressed and temperature-risen by the compressing facility 600 is supplied together with the high temperature air from the filter 302 during the liquefaction process, temperature of the air supplied to the intermediate heat exchanging facility 500 is increased compared to that of the first embodiment of the present invention described above. Therefore, it is possible to employ a material having a high melting point and a high boiling point (for example, water, methanol and the like) as the second heat medium.

Figure 12:
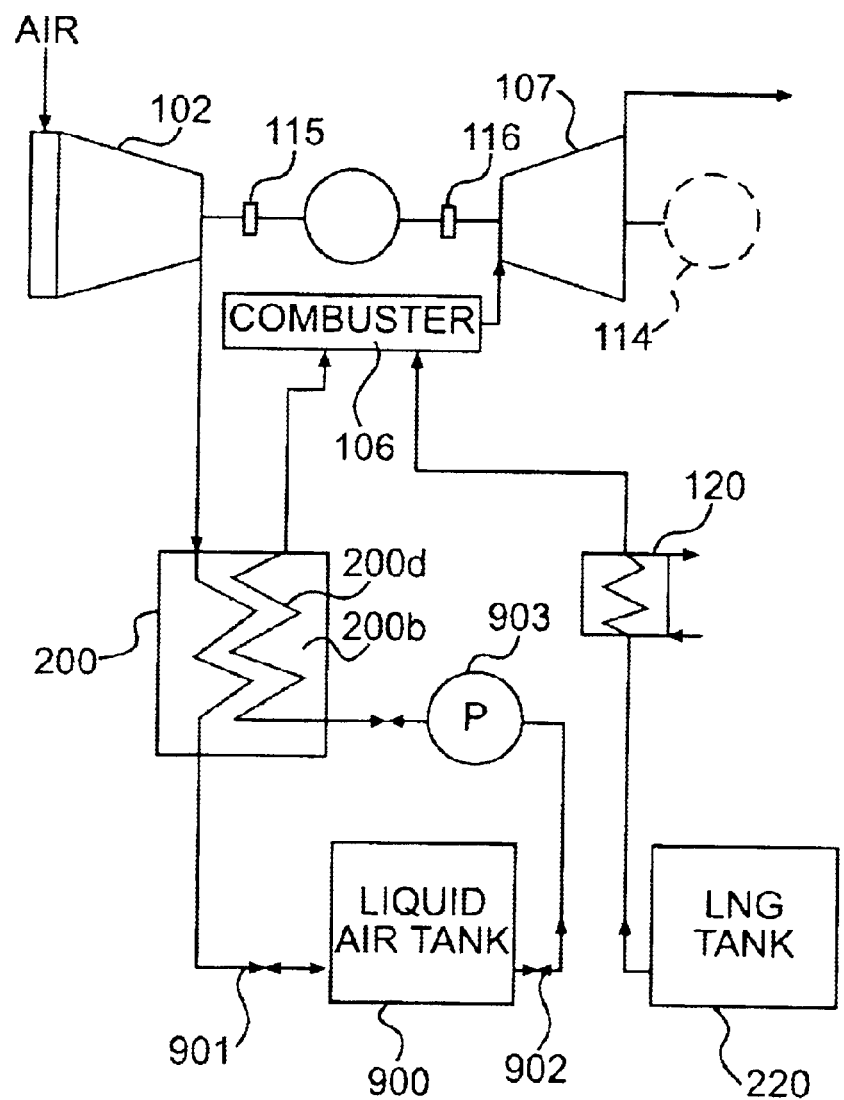
FIG. 12 is a diagram showing the mechanical systems of an energy storage gas-turbine electric power generating system in accordance with the present invention.

An energy storage gas-turbine electric power generating system is illustrated in FIG. 12 which comprises as essential components, a liquid air storage tank 900, a pump 903 for raising the pressure of the liquid air, a heat regenerator 200, a gas turbine 107, a generator 114 and a compressor 102.

In FIG. 12, air is compressed and the compressed air is sent to a heat regenerator 200. The compressed air is cooled by a heat medium through heat exchange to be liquid air and the heat of the compressed air is stored in the heat medium which is heated by the compressed air. The liquid air is stored in a liquid air storage tank 900 through a valve 901.

Upon requirement of electric power, that is, when a gas turbine 107 is required to be driven, a valve 902 is opened and the liquid air stored in the liquid air storage tank 900 is pressurized by a liquid air pump 903 and sent to the heat regenerator 200 through a pipe 200d. In the heat regenerator 200, the pressurized liquid air is heated by the heat medium and vaporized to become pressurized air. The air is sent to a gas turbine combustor 106. A fuel of liquefied natural gas stored in a fuel storage tank 220 is vaporized to be gas fuel through a heat exchanger such as fuel vaporizing unit 120, a fuel cold recovery unit, or the like. The fuel in the gas phase is sent to the combustor 106 and burned with the air to produce combustion gas. The combustion gas is supplied to the gas turbine 107 to drive the turbine. The gas turbine 107 drives a generator such as a motor-generator or a generator 114 to generate electric power.

The compressor 102 is driven by a power source such as a motor, motor-generator, or the turbine. When the motor generator is used, a clutch 116 is opened and a clutch 115 is closed to connect them.

The heat regenerator 200 can be replaced by a liquefaction/vaporizing facility 200 as shown in FIG. 1 which has heat exchangers 401, 501, 801 with heat medium stored in tanks 402, 502, 802; 406, 506, 806. When the compressed air is liquefied to be liquid air, the compressed air is cooled by the heat medium to be liquid air while the heat medium is heated, and when the liquid air is vaporized, the liquid air is heated by the heat medium to be vaporized while the heat medium is cooled.

That is, the liquefaction/vaporizing facility 200 stores or accumulates heat or cold energy to use cooling air or heating liquid air.

Figure 13:
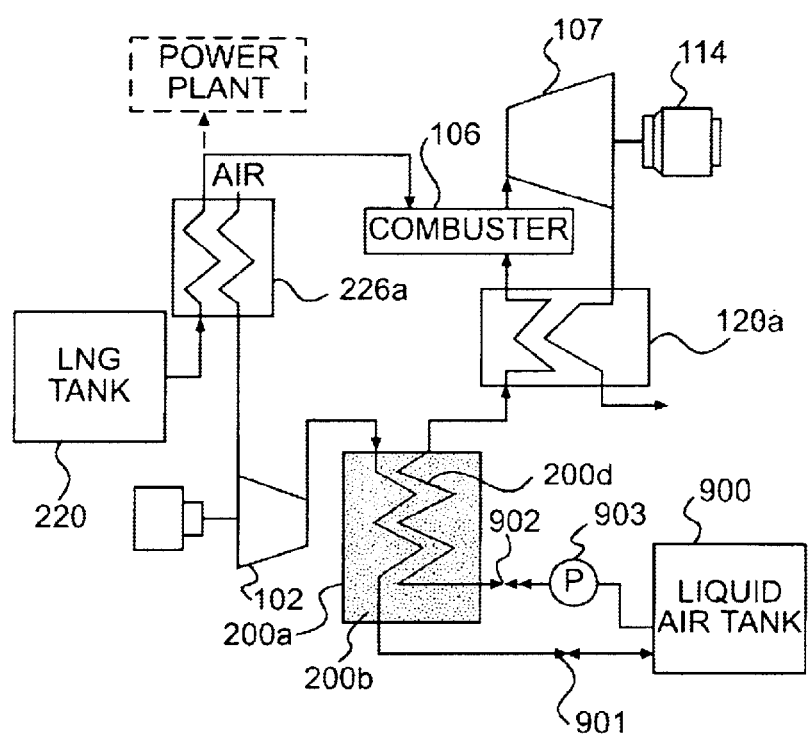
FIG. 13 is a diagram showing the mechanical systems of an energy storage gas-turbine electric power generating system in accordance with the present invention.

When electric power demand is small for instance, electric power is stored as liquid air. Thus, in FIG. 13, air to be supplied to a compressor 102 is cooled by a LNG heat regenerator/heat exchanger and supplied to the compressor 102. The air is compressed by the compressor 102 to be high pressure, and sent to a heat regenerator 200a having a heat medium. The air is cooled by the heat medium of the heat regenerator 200a to be liquid air while the heat medium is heated and stored as liquid air in a liquid air storage tank 900.

When electric power demand is large, the electric power stored as liquid air is used. That is, the liquid air is pressurized by a liquid air pump 903, the pressurized liquid air is sent to the heat regenerator 200a in which the liquid air is heated by the heat medium while the heat medium is cooled. The liquid air or air from the heat regenerator 200a is vaporized by a regenerative heat exchanger 120a and supplied to a gas turbine combustor 106. Fuel of LNG stored in the LNG tank 220 is vaporized by the fuel cold energy recovery unit 226a and supplied to the gas turbine combustor 106 to be burnt in support of the air. Combustion gas from the combustor 106 is supplied to a gas turbine 107 to drive the turbine. The gas turbine 107 drives a generator 114 to generate electric power.

The heat medium 200b stores cold energy or heat energy therein. For example, if it heat-exchanges a medium of higher temperature than the heat medium 200b, it is heated and the heat is stored in the heat medium 200b and if it heat-exchanges with a medium of lower temperature than the heat medium 200b, it is cooled and the cold energy is stored therein. The heat regenerator has at least one liquid passage 200d and a heat medium for accumulating heat or cold energy therein.

What is claimed is:

1. An energy storage gas-turbine electric power generating system comprising:

a liquid air storage for storing liquid air;

a pump for raising the pressure of the liquid air from the liquid air storage;

a cold energy regenerator for storing therein cold energy of the liquid air transferred through said pump while evaporating the liquid air to be high-pressure air and liquefying air by using the stored cold energy;

a gas turbine driven by utilizing the high pressure air;

a generator driven by said gas turbine for generating electric power;

a compressor for compressing air, the compressed air being sent to said cold energy regenerator and liquefied therein with cold energy stored therein, to be liquid air, and the liquid air being stored in said liquid air storage tank.

2. An energy storage gas-turbine electric power generating system according to claim 1, wherein said cold energy regenerator comprises a cold energy storing medium and at least one fluid passage through which said liquid air storage tank and said combustor are fluidly communicated to store the cold energy of the liquid air into the cold energy storing medium while evaporating in said cold energy evaporator at one time and said compressor and said liquid air storage tank are communicated to liquefy the air from said compressor with the cold energy stored in the cold energy storing medium at another time different from said one time.

3. An energy storage gas-turbine electric power generating system comprising:

a liquid air storage for storing liquid air;

a pump for raising the pressure of the liquid air from said liquid air storage;

a cold energy regenerator for storing therein cold energy of the liquid air transferred through said pump while evaporating the liquid air to be high-pressure air;

a combustor for burning fuel with the high pressure air from said cold energy regenerator to produce a combustion gas;

a gas turbine driven by utilizing the combustion gas;

a generator driven by said gas turbine for generating electric power;

a liquefied fuel storage tank for storing liquefied fuel;

a heat exchanger for heat-exchanging between heat medium and liquefied fuel from said liquefied fuel storage tank, the fuel after heat-exchanging in said heat exchanger being sent to said combustor to be burned with the high pressure air; and a compressor for compressing the air from said heat exchanger, the compressed air being sent to said cold energy regenerator and liquefied therein with cold energy stored therein, to be liquid air, and the liquid air being stored in said liquid air storage tank;

wherein liquefaction of the compressed air and storage of cold energy of the liquid air while evaporating the liquid air are effected in said cold energy regenerator at different times.

4. An energy storage gas-turbine electric power generating system according to claim 3, wherein said cold energy regenerator comprises a heat medium and at least one pipe for passing the liquid air or compressed air.

5. An energy storage gas-turbine electric power generating system according to claim 3, wherein said cold energy regenerator includes means for accumulating cold energy of the liquid air, the compressed air being liquefied with the accumulated cold energy.

* * * * *